United States Patent
Cregg

(10) Patent No.: US 9,438,573 B2
(45) Date of Patent: Sep. 6, 2016

(54) SYSTEMS AND METHODS TO SECURELY INSTALL NETWORK DEVICES USING PHYSICAL CONFIRMATION

(71) Applicant: SmartLabs, Inc., Irvine, CA (US)

(72) Inventor: Daniel Brian Cregg, Lake Elsinore, CA (US)

(73) Assignee: SMARTLABS, INC., Irvine, CA (US)

(*) Notice: Subject to any disclaimer, the term of this patent is extended or adjusted under 35 U.S.C. 154(b) by 1 day.

(21) Appl. No.: 14/539,627

(22) Filed: Nov. 12, 2014

(65) Prior Publication Data

US 2016/0134605 A1 May 12, 2016

(51) Int. Cl.
H04L 29/06 (2006.01)
H04L 29/08 (2006.01)
H04B 3/54 (2006.01)
H04W 12/04 (2009.01)

(52) U.S. Cl.
CPC .............. *H04L 63/062* (2013.01); *H04B 3/542* (2013.01); *H04L 67/10* (2013.01); *H04W 12/04* (2013.01)

(58) Field of Classification Search
None
See application file for complete search history.

(56) References Cited

U.S. PATENT DOCUMENTS

| 6,526,506 B1 * | 2/2003 | Lewis | H04L 9/083 380/278 |
|---|---|---|---|
| 7,050,789 B2 * | 5/2006 | Kallio | H04L 63/06 380/270 |
| 7,102,502 B2 | 9/2006 | Autret | |
| 7,345,998 B2 | 3/2008 | Cregg et al. | |
| 7,494,106 B2 | 2/2009 | Mathis | |
| 7,663,502 B2 | 2/2010 | Breed | |
| 7,755,505 B2 | 7/2010 | Johnson | |
| 7,872,423 B2 | 1/2011 | Biery | |
| 7,904,187 B2 | 3/2011 | Hoffberg | |
| 8,081,649 B2 | 12/2011 | Cregg et al. | |
| 8,190,275 B2 | 5/2012 | Change | |
| 8,230,466 B2 | 7/2012 | Cockrell | |
| 8,285,326 B2 | 10/2012 | Carmody | |

(Continued)

FOREIGN PATENT DOCUMENTS

WO WO 2006/065275 6/2006

OTHER PUBLICATIONS

Perez, 802.11i—How we got here and where are we headed, SANS Institute, 2004.*

(Continued)

*Primary Examiner* — Minh Dinh
(74) *Attorney, Agent, or Firm* — Knobbe, Martens, Olson & Bear, LLP

(57) ABSTRACT

A cloud server communicates with a network controller over communication channels of a communication network to securely install a new device having a unique identifier and a device key onto a home-control network associated with a network key. The network device sends its unique identifier over the home-control network to the network controller and the network controller passes the unique identifier over the communication channels to the cloud server. the cloud server retrieves a device key associated with the network device based on the unique identifier and transmits the device key to the network controller over the communication channels. The network controller sends a message comprising the device key to the network device over the home-control network. The message is formatted to deliver the network key to the network device to permit the network device to send and receive messages comprising the network key over the home-control network.

16 Claims, 29 Drawing Sheets

(56) References Cited

U.S. PATENT DOCUMENTS

| | | |
|---|---|---|
| 8,301,180 B1 | 10/2012 | Gailloux |
| 8,332,495 B2 | 12/2012 | Lancaster |
| 8,495,244 B2 | 7/2013 | Bonar |
| 8,516,087 B2 | 8/2013 | Wilson |
| 8,610,305 B2 | 12/2013 | Sarid |
| 8,619,819 B2 | 12/2013 | Seelman |
| 8,653,935 B2 | 2/2014 | Baker |
| 9,014,067 B2 | 4/2015 | Chun |
| 9,054,892 B2 | 6/2015 | Lamb |
| 9,071,453 B2 | 6/2015 | Shoemaker |
| 9,078,087 B2 | 7/2015 | Yoon |
| 9,081,501 B2 | 7/2015 | Asaad et al. |
| 9,143,962 B2 | 9/2015 | Brady |
| 9,148,443 B2 | 9/2015 | Chizeck |
| 9,232,615 B2 | 1/2016 | Cregg et al. |
| 9,300,484 B1 | 3/2016 | Cregg et al. |
| 2003/0103521 A1 | 6/2003 | Raphaeli et al. |
| 2003/0142685 A1 | 7/2003 | Bare |
| 2004/0243684 A1 | 12/2004 | Ha et al. |
| 2006/0126617 A1 | 6/2006 | Cregg |
| 2006/0174102 A1 | 8/2006 | Smith |
| 2006/0210278 A1 | 9/2006 | Cregg |
| 2007/0260558 A1 | 11/2007 | Look |
| 2008/0037792 A1 | 2/2008 | Becker et al. |
| 2008/0065884 A1 * | 3/2008 | Emeott ............... H04L 9/0836 713/168 |
| 2009/0102682 A1 | 4/2009 | Corndorf |
| 2010/0121968 A1 | 5/2010 | Clark |
| 2014/0022061 A1 | 1/2014 | Apte |
| 2014/0219193 A1 | 8/2014 | Linde |
| 2014/0269425 A1 | 9/2014 | Fisher |
| 2014/0280398 A1 | 9/2014 | Smith et al. |
| 2014/0321268 A1 | 10/2014 | Saltsidis |
| 2015/0097663 A1 | 4/2015 | Sloo |
| 2015/0120000 A1 | 4/2015 | Coffey et al. |
| 2015/0280994 A1 | 10/2015 | Kim |
| 2015/0295949 A1 | 10/2015 | Chizeck et al. |

OTHER PUBLICATIONS

INSTEON—WhitePaper: The Details, INSTEON, 2013.*
"Refresh! INSTEON Technology," Electronic Design (EE) Product News, Staff Article, Apr. 5, 2006.

* cited by examiner

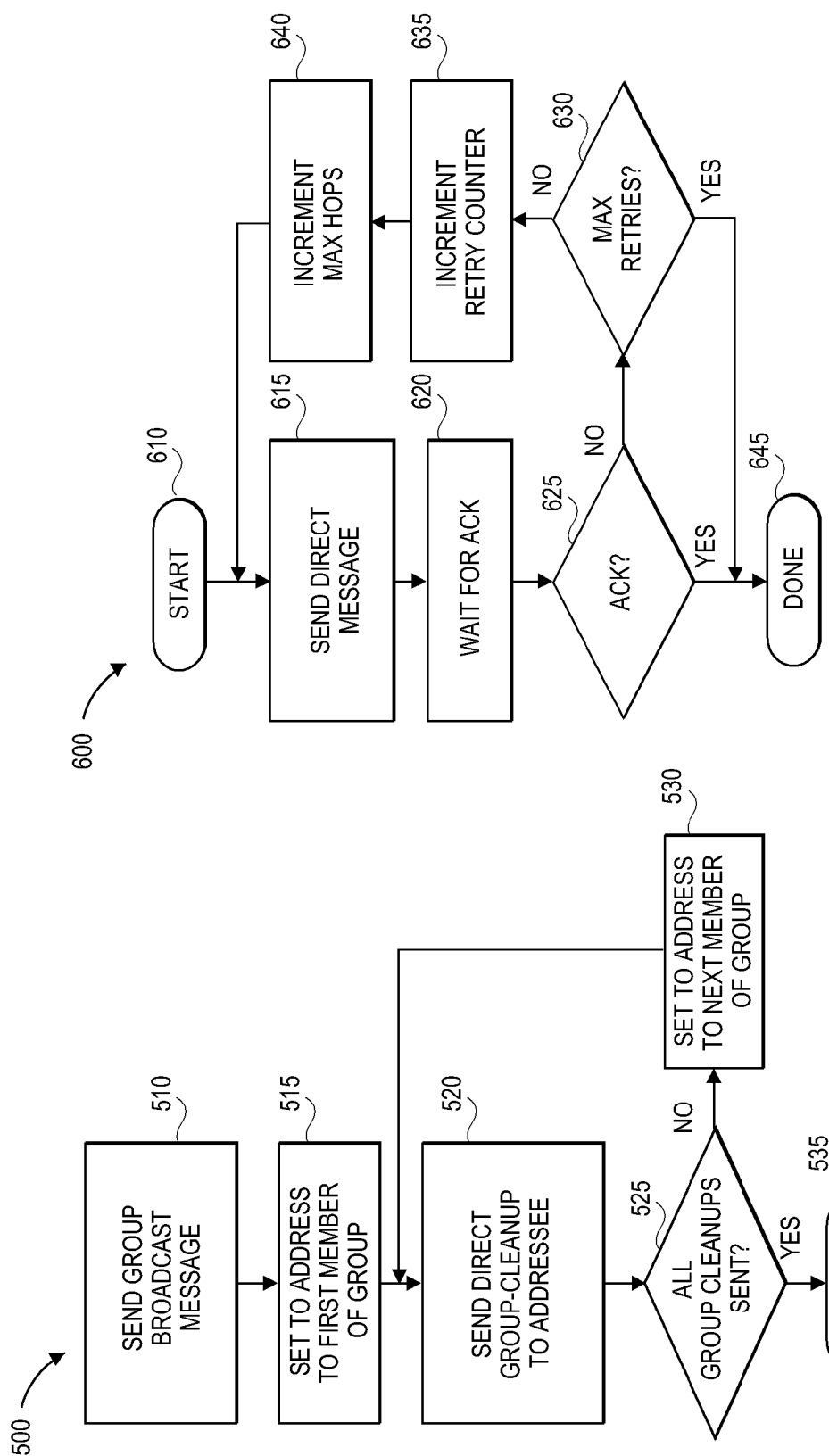

1700

| Center Frequency | 915 MHz |
|---|---|
| Data Encoding Method | Mancester |
| Modulation Method | FSK |
| FSK Deviation | 64 KHz |
| FSK Symbol Rate | 76,800 symbols per second |
| Data Rate | 38,400 bits per second |
| Range | 150 feet outdoors |

FIG. 29

SYSTEMS AND METHODS TO SECURELY INSTALL NETWORK DEVICES USING PHYSICAL CONFIRMATION

INCORPORATION BY REFERENCE TO ANY PRIORITY APPLICATIONS

Any and all applications for which a foreign or domestic priority claim is identified in the Application Data Sheet as filed with the present application are hereby incorporated by reference under 37 CFR 1.57.

BACKGROUND

Home automation networking technology enables light switches, lights, thermostats, motions sensors, and other devices to interoperate. As the homeowner arrives home, the system can automatically open the garage door, unlock the front door, disable the alarm, light the downstairs, and turn on the TV, for example. The various household devices are connected with each other to form a network and act as a "smart home". However, hackers entering a smart home network might be able to turn off lights, reprogram HVAC systems, blow speakers, unlock doors, disarm alarm systems, or worse.

SUMMARY

Networking technology can employ message encryption and unique device identifiers when sending and receiving messages over the network for security. There is also need to have security measures in place when creating a new network or installing devices and hubs on an existing network.

Embodiments disclose systems and methods to securely install new devices on an existing network, new devices on a new network, a new network controller on an existing network, and a new network controller on a new network, and to securely reinstall an existing network controller on an existing or new network.

Unique methods to establish a network controller in the local home automation network with cloud servers are disclosed. Initially a new network controller is introduced into a home. A problem that can occur in a typical home local network is that the locally issued IP address by the local router is also issued to another device resulting in conflicting addresses, or the address issued to the network controller changes and is not propagated properly through all devices needing to communicate with the network controller. The network controller has to securely register itself with the communications or messaging server and the primary database or connect server. The messaging server is responsible for maintaining a persistent, responsive connection to devices outside the home, without requiring port-forwarding rules to be configured in the local home router, and without having a publicly exposed IP server in the home. This provides a secure configuration. The connect server is responsible for maintaining user name and password with valid account status. If a new network controller, in a new home, does not have a matching user account it, it is registered with the messaging server and waits for an account to be created.

Other embodiments disclose systems and methods to get the private key for the home network to the device being added to the network. In an embodiment, a private encryption code is installed in each device at the factory. In order to become part of the groups and functions of the house, each device acquires the private house key. With or without the private key for the house, all devices will repeat all messages as long as the message hop count is greater than 0 and the house code of the message is known. In an embodiment, the messages are INSTEON® messages.

Disclosed herein are systems and methods to securely add a device to the network. In an embodiment, a user can enter a private key and ID from the label on a first device into an intelligent device, such as a smartphone, that communicates to the cloud servers, and the servers securely provide the private key of the new device to the network controller. The network controller then communicates securely the private house key to the new device using the private device key already known to the new device. In another embodiment, first device securely receives the private house key from the cloud servers via a communication process outside the home network.

There are additional options now that there is at least one device other than the network controller that has the private key to the home. An additional device, in an embodiment, could be added by manually entering, scanning, or other automated audible or visual processes the data off the additional device to the intelligent device. In another embodiment, the intelligent device can detect a blinking pattern from the existing device, where the blinking pattern conveys the private home key. The intelligent device can then convey the private home key to the new device.

In a further embodiment, the new device produces a blinking pattern comprising the new device private key to allow the network controller to communicate privately with the new device, where the private communications with the new device comprise the house private key. This allows the new device to receive and decode messages from the network controller and other devices in the network.

In a further embodiment, the intelligent device could initiate a linking mode on the network controller, and instruct the user to place the new device into linking mode using a physical means. Once placed in linking mode, the network controller passes the identity of the new device to the cloud servers. The cloud servers will use the identity to find the new device's private key in the cloud database, established from the factory at the time the new device was created. The private key will be passed in a secure means to the network controller. The network controller will use the private key of the new device to initiate passing the home private key. The new device will now be part of the home-secured communications.

In an embodiment, a cloud server communicates with a network controller over communication channels of a communication network to securely install a new device having a unique identifier and a device key onto a home-control network associated with a network key. The network device sends its unique identifier over the home-control network to the network controller and the network controller passes the unique identifier over the communication channels to the cloud server. the cloud server retrieves a device key associated with the network device based on the unique identifier and transmits the device key to the network controller over the communication channels. The network controller sends a message comprising the device key to the network device over the home-control network. The message is formatted to deliver the network key to the network device to permit the network device to send and receive messages comprising the network key over the home-control network.

According to a number of embodiments, the disclosure relates to a system to install a network device into a home-control network. The system comprises a hub storing in memory a network key and configured to send and receive messages comprising the network key over a home-control network, a network device storing in memory a unique device identifier and a device key different from the network key, where the network device is configured to receive encrypted messages comprising the device key over the home-control network and to send an unencrypted message comprising the unique device identifier to the hub over the home-control network, and at least one cloud server configured to communicate with the hub and an intelligent device using communication channels of a second network. The hub is further configured to send the unique device identifier to the at least one cloud server over the communication channels, the at least one cloud server is further configured to retrieve a device key associated with the network device based on the unique device identifier and to send the device key to the hub over the communication channels, and the hub is further configured to transmit a message comprising the received device key to the network device over the home-control network, where the message formatted to deliver the network key to the network device to permit the network device to send and receive messages comprising the network key over the home-control network.

Certain embodiments relate to a method to install a network device into a home-control network. The method comprises storing in a memory of a hub a network key, where the hub is configured to send and receive messages comprising the network key over a home-control network, storing in a memory of a network device a unique device identifier and a device key different from the network key, transmitting an unencrypted message including the unique device identifier from the network device to the hub over the home-control network, transmitting the unique device identifier from the hub to at least one cloud server over communication channels of a second network, retrieving a device key associated with the network device based on the unique device identifier, transmitting the device key from the at least one cloud server to the hub over the communication channels, and transmitting a message comprising the device key from the hub to the network device over the home-control network, where the message is formatted to deliver the network key to the network device to permit the network device to send and receive messages comprising the network key over the home-control network. In an embodiment, the method further comprises sending the unencrypted message including the unique device identifier after a user performs a physical action to place the network device in the enrollment mode.

In an embodiment, the unique device identifier comprises a random number unique to the network device. In another embodiment, the network key comprises an encryption code unique to the home-control network. In a further embodiment, the device key comprises an encryption code unique to the network device. In a yet further embodiment, the home-control network comprises a mesh network configured to propagate messages using powerline signaling and radio frequency (RF) signaling. In another embodiment, the powerline signaling comprises message data modulated onto a carrier signal and the modulated carrier signal is added to a powerline waveform, and the RF signaling comprises the message data modulated onto an RF waveform.

In an embodiment, the intelligent device comprises a smartphone. In another embodiment, the network device is further configured to send the unencrypted message including the unique device identifier after a user performs a physical action to place the network device in the enrollment mode. In a further embodiment, the message comprising the received device key comprises an encrypted message, where the encryption is based on the device key. In a yet further embodiment, the messages comprising the network key comprise encrypted messages, where the encryption is based on the network key.

For purposes of summarizing the disclosure, certain aspects, advantages and novel features of the inventions have been described herein. It is to be understood that not necessarily all such advantages may be achieved in accordance with any particular embodiment of the invention. Thus, the invention may be embodied or carried out in a manner that achieves or optimizes one advantage or group of advantages as taught herein without necessarily achieving other advantages as may be taught or suggested herein.

BRIEF DESCRIPTION OF THE DRAWINGS

FIG. 17 illustrates a process to transmit messages to groups of network devices within the network, according to certain embodiments.

FIG. 18 illustrates a process to transmit direct messages with retries to network devices within the network, according to certain embodiments.

FIG. 29 is a table of exemplary specifications for RF signaling within the network, according to certain embodiments.

DETAILED DESCRIPTION OF THE PREFERRED EMBODIMENT

The features of the systems and methods will now be described with reference to the drawings summarized above. Throughout the drawings, reference numbers are re-used to indicate correspondence between referenced elements. The drawings, associated descriptions, and specific implementation are provided to illustrate embodiments of the inventions and not to limit the scope of the disclosure.

It is increasingly important to maintain network security in networks, such as home automation network, for example. Without proper security, hackers can interfere with network operation. In the home-automation-network example, hackers can control lights, heating, cooling, door locking/unlocking, and the like in a home. Network security is important during the operation of the network as well as during setup and installation of additional network devices and network controllers.

Systems and methods to enroll a network device into a network that includes a private encryption key are disclosed. In an embodiment, a user using an intelligent device, such as a smartphone, and the like, initiates a communication to a web based server to authenticate and gain access to a network controller on the network, and using that access, enrolls new devices into the network. The network controller is instructed to enter a linking mode by the intelligent device through secure communications. The user is instructed to place the new device to be linked into linking mode through a physical action. The new device generates an un-encrypted message including a unique identifier to the network controller. The network controller passes the message to the cloud servers through secure communications. The cloud servers use the new device's unique identifier to pass the new device's private key to the network controller to allow the network controller to pass to the new device the private network key, securely, using the device's private key. In an embodiment, the device's private key and the device's unique identifier are installed at the factory. Once enrolled, the new device responds to the private network key encrypted messages.

Figure 1:
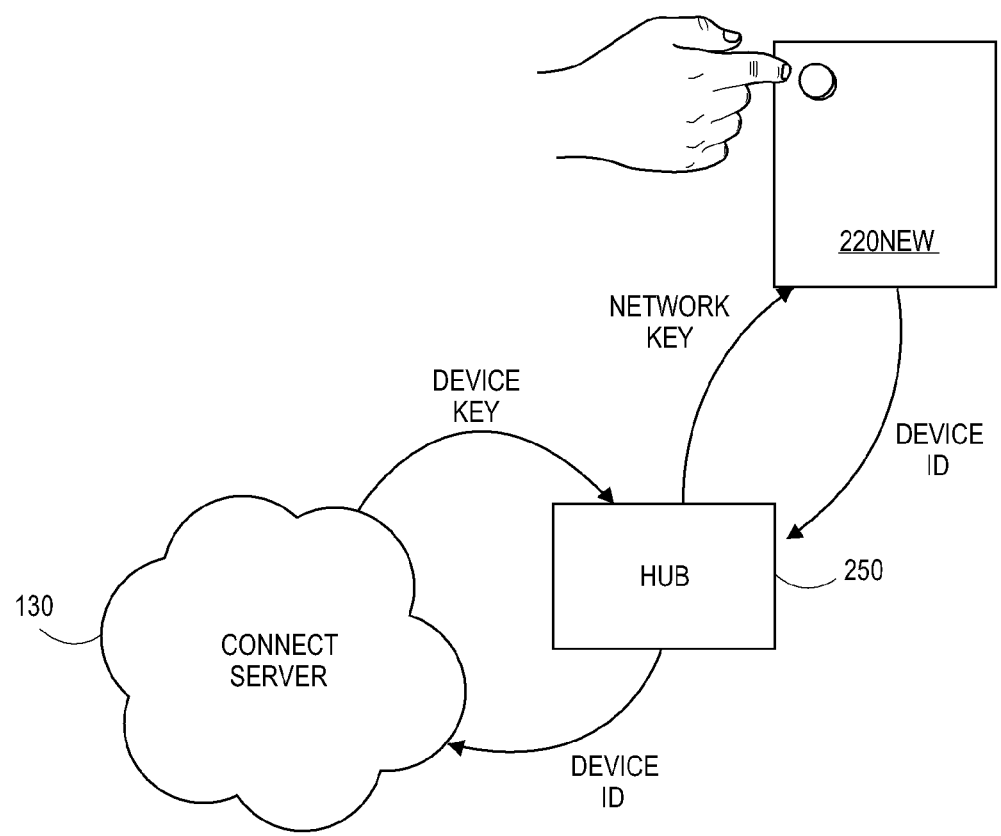
FIG. 1 illustrates a process to securely install a network device on a network using a cloud server, according to certain embodiments.

FIG. 1 is a block diagram illustrating an embodiment of secure installation of a new device 220NEW onto a home-control network using a cloud server 130. An intelligent device, such as a smartphone, displays instructions for the user to provide a physical interaction with the new device 220NEW to be installed on the home-control network. In the illustrated example, the user pushes a button on the new device 220NEW. In response to the physical interaction, the new device 220NEW sends a link message including the unique identifier of the new device 220NEW to the network controller 250 over the home-control network. The network controller 250 passes the unique identifier to the cloud server 130 over a second network, where the cloud server 130 retrieves a device key associated with the new device 220NEW based at least in part on the unique identifier. The cloud server 130 sends the device key to the network controller 250 over the second network and the network controller 250 uses the device key to send a network key to the new device 220NEW over the home-control network, where the network key permits the new device 220NEW to securely communicate over the home-control network.

Additional embodiments of secure network installation procedures are disclosed herein.

Figure 2:
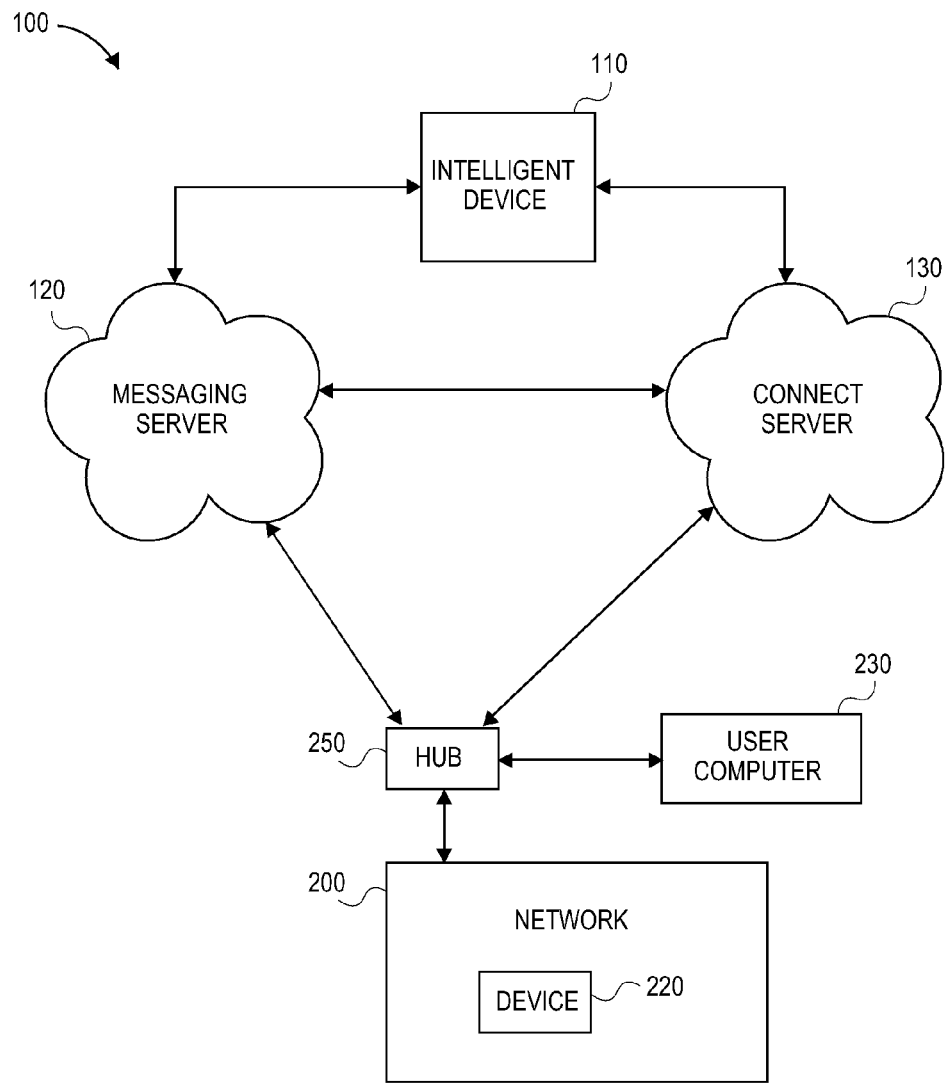
FIG. 2 is a block diagram illustrating a network installation system, according to certain embodiments.

FIG. 2 is a block diagram illustrating a network installation system 100 comprising a messaging server 120, a connect server 130, and the intelligent device 110 to securely install a network controller, an intelligent controller or hub 250 onto a communication network 200.

During operation of the network 200, the network controller 250 is configured to transmit data and/or commands through the network 200 to network devices 200 and to receive through the network 200 messages from the network devices 220. The network controller 250 can further be configured to provide information to a user through one or more of the intelligent device 110 and a computer 230 and/or to receive user commands from the user through one or more of the intelligent device 110 and the user computer 230.

In an embodiment, the network 200 comprises a dual-band mesh area networking topology to communicate with devices 220 located within the network 200. The network devices 220 can comprise, for example, light switches, thermostats, motion sensors, and the like. In an embodiment, the network 200 comprises a home-control network. In another embodiment, the network 200 comprises an INSTEON® network utilizing an INSTEON® engine employing a powerline protocol and an RF protocol as is further described with respect to FIGS. 17-32.

It is important that the network 200 be a secure network to prevent unauthorized access of the network 200 and the network devices 220 during network operation. Before operation of the communication network 200, the network controller 250 and the network devices 220 are installed onto the network 200. To maintain network security, unique device identifiers associated with each network device 220 and/or authorization tokens/keys that authorize network communications between devices 220, 250 are provided to the devices 220, 250, respectively, outside of the network 200. In some embodiments, an action taken by the user confirms at least a portion of the installation process to maintain security.

Further, it is important that communications between the network controller and intelligent also be secure to prevent unauthorized access to the network. Further yet, it is important that the information used to set up the secure communications between the network controller and the intelligent device be handled in a way that prevents unauthorized access to the network.

Figure 3:
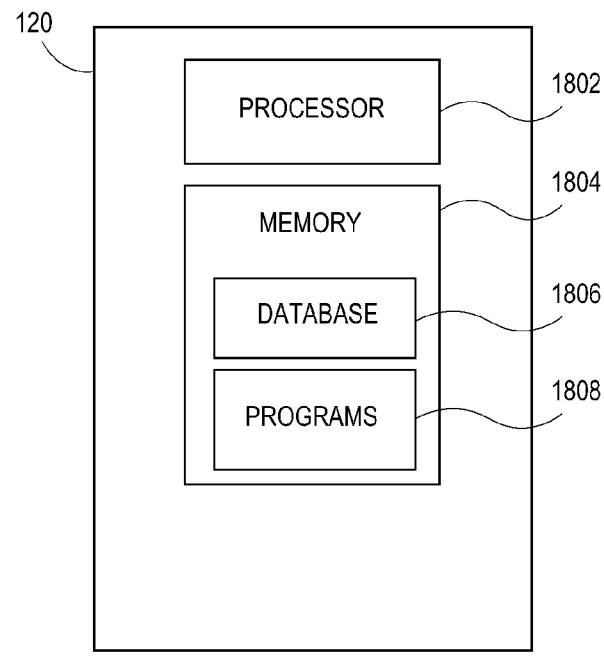
FIG. 3 is a block diagram illustrating a messaging server, according to certain embodiments.

Referring to FIG. 2, in an embodiment, the messaging server 120 communicates with the intelligent device 110, the connect server 130, and the network controller 250. FIG. 3 illustrates a block diagram of the messaging server 120 comprising a processor 1802 and memory 1804. The memory 1804 comprises one or more databases 1806 and one or more programs 1808 where the processor 1802 is configured to access the databases 1806 and execute the programs 1808 to provide cloud-hosted messaging services.

The messaging server 120 is located in the cloud where it receives and transmits through a global network such as the Internet. In an embodiment, the messaging server 120 is at least a part of a cloud-hosted messaging service based on a standard messaging protocol that is configured to send and receive messages and provide computing services to host, manage, develop, and maintain applications. In another embodiment, the messaging service comprises the messaging server 120.

In an embodiment, the messaging server 120 utilizes a publish/subscribe and presents messaging patterns where senders of messages, called publishers, do not program the messages to be sent directly to specific receivers, called subscribers. Instead, published messages are characterized into classes, without knowledge of what, if any, subscribers there may be. Similarly, subscribers express interest in one or more classes, and only receive messages that are of interest, without knowledge of what, if any, publishers there are. Thus, the messaging server 120 provides a communications platform that enables the network controller 250 to have a persistent connection between the network controller 250 and the connect server 130. An example of a publish/subscribe messaging service is PubNub™. Examples of other messaging services are, Amazon Web Services, Firebase, Frozen Mountain, Pusher, and the like.

Figure 4:
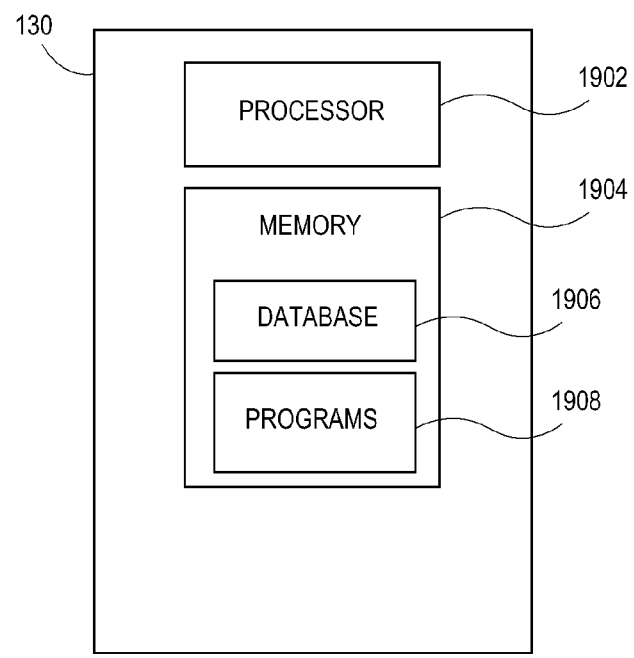
FIG. 4 is a block diagram illustrating a connect server, according to certain embodiments.

Referring to FIG. 2, In an embodiment, the connect server 130 communicates with the intelligent device 110, the messaging server 120, and the network controller 250. FIG. 4 is a block diagram of the connect server 130 comprising a processor 1902 and memory 1904. The memory 1904 comprises one or more databases 1906 and one or more programs 1908 where the processor 1902 is configured to access the databases 1906 and execute the programs 1908 to provide communication between the web-based applications 1908 and databases 1906 and the network controller 250. In an embodiment, the connect server 130 communicates with a plurality of network controllers 250, where each of the network controllers 250 is associated with a network 200. The connect server 130 communicates with the plurality of network controllers through channels where the channels comprise one or more global channels that allow communications with more than one network controller 250 and sets of individual channels that allow the control server 130 to communicate with one network controller.

The connect server 130 is located in the cloud where it receives and transmits through a global network such as the Internet. In an embodiment, the connect server 130 is at least a part of a cloud-based home management service configured to provide communication between web-based applications and databases and the network controller 250. In an embodiment, the web-based applications run on the intelligent devices 110. In an embodiment, the Insteon® connect web services comprises the connect server 130.

Referring to FIG. 2, the intelligent device 110 communicates with the messaging server 120 and the connect server 130. The intelligent device 110 is remote from the network 200, or in other words, the intelligent device 110 is not part of the network 200. In an embodiment, the intelligent device 110 a personal computer, a laptop, a notebook, a tablet, a smartphone, or the like, and interfaces with a user. In another embodiment, the intelligent device 110 comprises a user-operated device configured to operate with a client application and comprising a mobile operating system, such as, for example, Android, iOS, and the like, home automation desktop software, such as HouseLinc™ and the like, websites, or the like. In an embodiment, the intelligent device 110 runs an application that enables the user through the intelligent device to send commands to the network controller 250 to control the devices 220 on the network 200 and to receive responses or status from the devices 220 via the network controller 250.

In the embodiment illustrated in FIG. 2, the network controller 250 is web-enabled and is configured to communicate with the messaging server 120 and the connect server 130 over a global network, such as the Internet.

Further, the network controller 250, the connect server 130 and the intelligent device are configured to communicate over private networks formed as a subset of the Internet through the messaging service and the messaging server 120. In an embodiment, the messaging server 120 provides a communication platform for communications between the connect server 130 and the network controller 250 and a communication platform between the intelligent device 110 and the network controller 250.

The installation system 100 is configured to provide a secure and robust platform to communicate with the network controller 250. The messaging server 120 provides a communication platform that permits the network controller 250 to maintain a persistent connection to send and receive multiple requests/responses between the network controller 250, at least one intelligent device 110, and the connect server 130.

Secure Network Controller Installation

Figure 5:
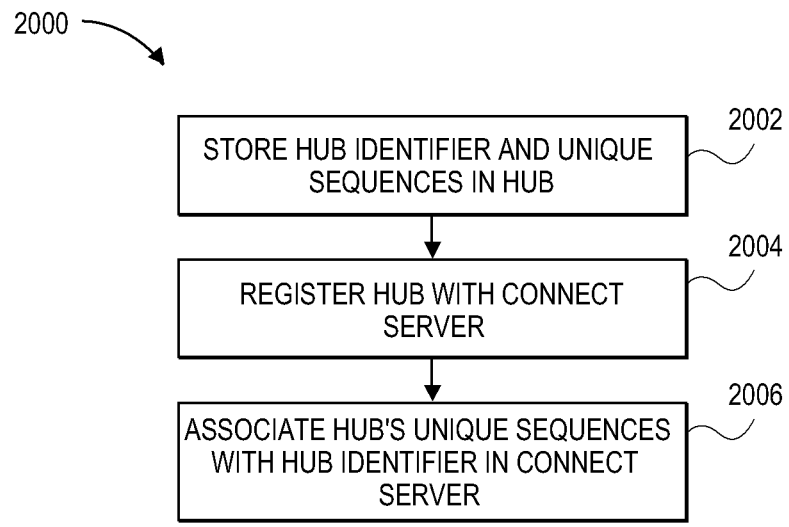
FIG. 5 illustrates a process to initialize a network controller and a connect server prior to secure network controller installation, according to certain embodiments.
Figure 6:
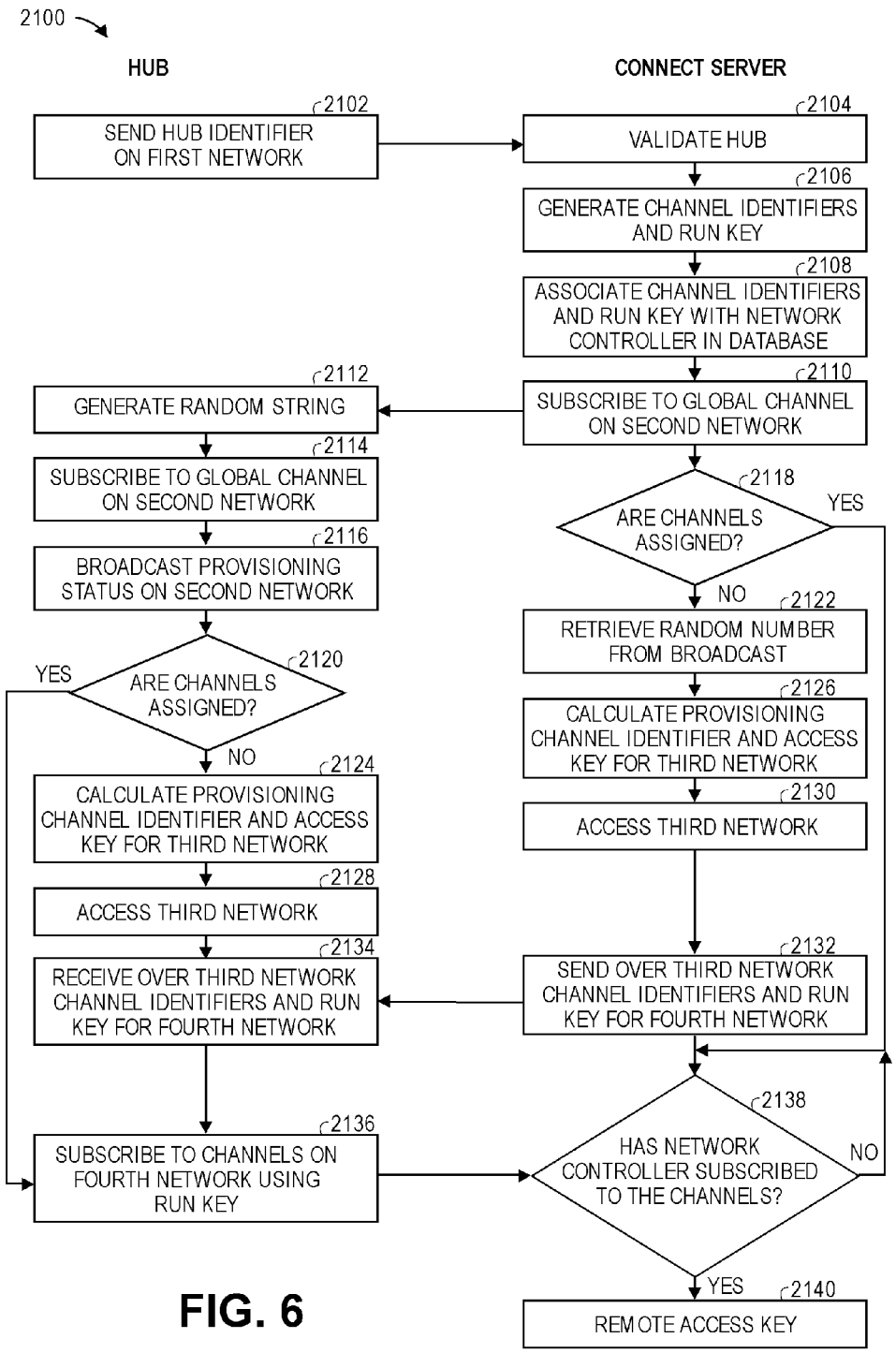
FIG. 6 illustrates an exemplary process to securely install in the network controller the information to establish a communication path between the network controller and an intelligent device, according to certain embodiments.
Figure 7:
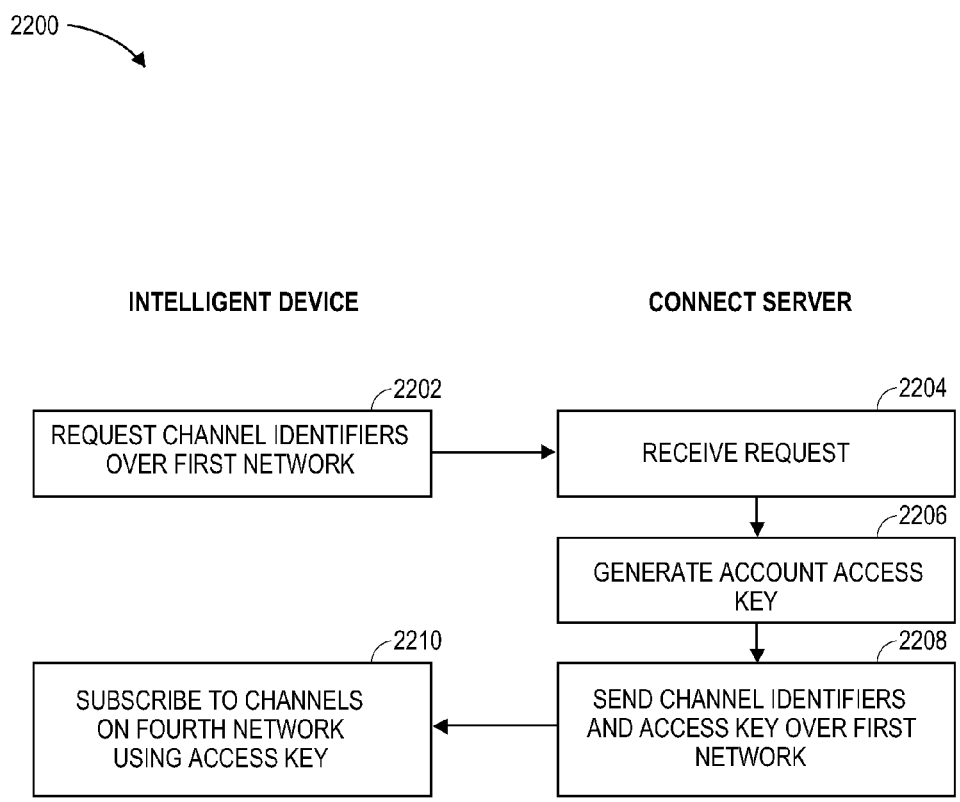
FIG. 7 illustrates an exemplary process between a connect server and an intelligent device to install in the intelligent device the information to establish the communication path between the network controller and the intelligent device, according to certain embodiments.

FIGS. 5-7 are exemplary flowcharts illustrating how the network controller 250, the intelligent device 110, and the connect server 130 work with the messaging server 120 to securely install the information to establish a communication path between the network controller 250 and the intelligent device 110.

FIG. 5 illustrates an exemplary process 2000 to initialize the network controller 250 and the connect server 130 prior to secure network controller installation. Beginning at step 2002, the network controller 250 stores in its memory at least a hub identifier, an installation key, and a network key. In an embodiment, the hub identifier is an identifier unique to each hub. In an embodiment, the hub identifier comprises a random numeric or alphanumeric string. In an embodiment, the installation key comprises a random numeric or alphanumeric string used in the formation of network access keys during the secure installation of the network controller/intelligent device communication information in the network controller 250. In an embodiment, the network key comprises a numeric or alphanumeric string that is unique to the network 200 on which the network controller 250 is installed and identifies communications on that network 200.

In an embodiment, the hub identifier, the installation key, and the network key are stored in flash memory. In an embodiment, the manufacturer stores the hub identifier the installation key, and the network key in the memory of the network controller 250. In an embodiment, the installation key comprises a secret key.

At step 2004, a registration application registers the network controller 250 with the connect server 130. In an embodiment, the manufacturer registers the network controller 250 with the connect server 130. During the registration process at step 2006, at least the hub identifier, the installation key, and the network key are associated with the hub 250 and stored in the database 1906 of the connect server 130. In an embodiment, the database 1906 comprises a list a plurality of network controllers 250 and at least each network controller's associated hub identifier, installation key, and network key.

FIG. 6 illustrates an exemplary process 2100 to securely install in the network controller 250 the information to establish a communication path between the network controller 250 and the intelligent device 110. Beginning at step 2102, the network controller 250 sends its unique hub identifier to the connect server 130 over a first network, such as the Internet. In an embodiment, the network controller 250 sends the hub identifier upon start-up.

At step 2104, the connect server 130 receives the hub identifier and validates the network controller 250. In an embodiment, the connect server 130 looks up the hub identifier in its database 1906 to determine if the hub identifier is associated with a network controller 250 that has been registered. If the hub identifier is not found, the process 2100 ends, or in other words, the hub identifier is not associated with a network controller 250 that the connect server 130 can identity as real.

If the connect server 130 validates the network controller 250, the connect server 130 generates channel identifiers and a run key at step 2106. The channel identifiers are associated with communication channels that the network controller 250 and the intelligent device use to communicate. In an embodiment, the run key is a random number or random alphanumeric string generated by the connect server 130 and used by the network controller 250 to access the network controller/intelligent device communication channels.

In an embodiment, the network controller/intelligent device communication channels comprise a client-control channel, a client-control response channel, an alert channel, an administration channel, an administration response channel, and the like.

In an embodiment, the client-control channel is used to send commands from client applications, such as those running on the intelligent device 110, that request the network controller 250 to perform functions. Examples of the functions are set a value, get a value, enter linking mode, enter multi-linking mode, exit linking mode, enter unlinking mode, send group command, link occurred, get status, get settings, set time settings, set sunrise/sunset table, and the like.

In an embodiment, the network controller 250 publishes the response to any commands received from the client-control channel on the client-control response channel.

In an embodiment, network controller 250 publishes device activations within the network 200 on the alert channel. For example, when a leak sensor device 220 is triggered, the network controller 250 will use the alert channel to publish an indication representing the leak sensor as triggered.

In an embodiment, the network controller 250 receives update commands from client applications running on the intelligent device 110 on the administration channel.

In an embodiment, the network controller 250 publishes responses on the administration response channel to update commands received on the admiration channel.

At step 2108, the channel identifiers and the run key are associated with the network controller 250 in the database 1906.

At step 2110, the connect server 130 subscribes to a global channel on a second network associated with the messaging server 120.

At step 2112, the network controller 250 generates a random number. In an embodiment, the random number comprises a random alphanumeric string. In an embodiment, the random alphanumeric string comprises a salt. In an embodiment, the string comprises between one and 256 alphanumeric elements.

At step 2114, the network controller 250 also subscribes to the global channel on the second network, and at step 2116, the network controller 250 broadcasts its provisioning status over the second network. In an embodiment, the provisioning status message comprises the random number and an indication of whether the network controller 250 has already been assigned channel identifiers and a run key.

In an embodiment, the network controller 250 is located behind a firewall and cannot pull or receive requests from the connect server 130 to send its provisioning status. The second network associated with the messaging server 120 comprises a public network where all of the traffic can be seen by those on the second network.

At step 2118, the connect server 130 determines whether the network controller 250 is provisioned or in other words, whether the network controller 250 has been assigned channels, based on the provisioning status broadcast by the network controller 250. And at step 2120, the network controller 250 also determines, based on its provisioning status, whether it is provisioned with the channel information for communication with the intelligent device 110.

When the network controller is provisioned, the connect server 130 moves to step 2138 where it waits for the network controller 250 to subscribe to the channels and the network controller 250 moves to step 2136 where it subscribes to the channels.

When the network controller 250 is not provisioned, the connect server 130 passes the channel information to the network controller 250 privately such that the channel information is not shared over the public global channel of the second network.

At step 2122 the connect server 130 retrieves the random number from the provisioning status broadcast by the network controller 250. At step 2126, the connect server 130 calculates a channel name or identifier and an access key for a third network. In an embodiment, the connect server 130 calculates the channel identifier and the access key for the third network using an algorithm stored in the connect server 130 and based at least in part on one or more of the hub identifier, the installation key, and the random number retrieved from the provisioning status.

At step 2124, the network controller 250 calculates the channel name or identifier and the access key for the third network independent of the calculation performed by the connect server 130.

In an embodiment, the network controller 250 calculates the channel identifier and the access key for the third network using an algorithm stored in the network controller 250 and based at least in part on one or more of the hub identifier, the installation key, and the random number retrieved from the provisioning status. In an embodiment, the algorithm stored in the network controller 250 is the same algorithm stored in the connect server 130. In an embodiment, the algorithm is stored in the network controller 250 during initialization.

The network controller 250 and the connect server 130, each having independently generated the channel identifier and access key to the private third network, access the third network, respectively at steps 2128 and 2130.

At step 2132, the connect server 130 sends the channel identifier and run key to a fourth network to the network controller 250 over the private third network and waits at step 2138 for the network controller to subscribe to the channels of the fourth network.

At step 2134, the network controller 250 receives over the private third network the channel identifier and the run key for the fourth network and at step 2136, the network controller 250 subscribes to the channels on the fourth network using the channel identifier and the run key.

At step 2138, the connect server 130 confirms that the network controller 250 has subscribed to the channels of the fourth network and at step 2140, the connect server 130 revokes the access key to the private third network.

Thus, the network controller 250 is provisioned or in other words, the network controller 250 is configured to communicate over the channels of the fourth network.

FIG. 7 illustrates an exemplary process 2200 between the connect server 130 and the intelligent device 110 to install in the intelligent device 110 the information to establish the communication path between the network controller 250 and the intelligent device 110. Prior to the installation process, the user installs an installation application onto the intelligent device 110.

At step 2202, the intelligent device 110 requests over the first network, such as the Internet, the channel identifiers associated with the channels of the fourth network. At step 2204, the connect server 130 receives the request. At step 2206, the connect server 130 generates an account key to be used by the intelligent device 110 to access the fourth network. In an embodiment, the account key comprises a random string comprising numeric or alphanumeric elements.

At step 2208, the connect server transmits the channel identifier and the account key over the first network, and at step 2210, the intelligent device 110 subscribes to the channels of the fourth network using the channel identifiers and the account key.

Thus, the network controller 250 and the intelligent device 110 are both subscribed to the channels of the fourth network and are configured to communicate with each other. In an embodiment, the user via the intelligent device 110 sends messages to and receives messages from the network controller 250 via the fourth network to configure the home-control network 200. In another embodiment, the user via the intelligent device 110 sends messages to and receives messages from the network controller 250 via the fourth network to control devices 220 on the home-control network 200.

In an embodiment, the first network is different from the second network, third network, fourth network, and home-control network 200. In an embodiment, the second network is different from the first network, third network, fourth network, and home-control network 200. In an embodiment, the third network is different from the first network, second network, network, fourth network, and home-control network 200. In an embodiment, the fourth network is different from the first network, second network, third network, and home-control network 200. In an embodiment, the first network is different from the second network, third network, fourth network, and home-control network 200.

In an embodiment, each of the hub identifier, the installation key, network key, account key run key, account key is unique. In an embodiment, each of the hub identifier, the installation key, network key, account key run key, account key is a random number or random alpha-numeric string, and/or generated based at least in part on a random number or random alpha-numeric string.

Network Operation of Network Controller

Figure 8:
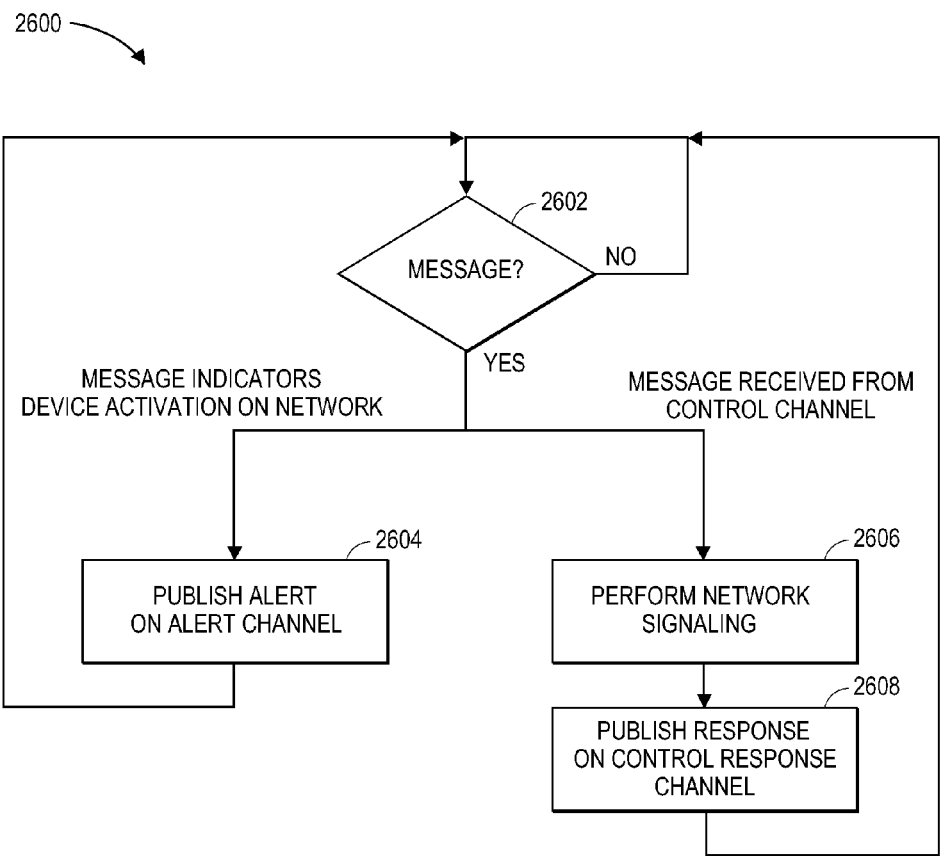
FIG. 8 illustrates a process for network controller operation after successful installation on the network, according to certain embodiments.

FIG. 8 illustrates an exemplary process 2600 for communications between the network controller 250 and the intelligent device 110 during network operation of the network controller 250. Once the network controller 250 is securely installed on the network 200, the network controller 250 is ready to report messages received over the network 200 from the network devices 220 to the intelligent device 110 and to respond to commands from the user via the intelligent device 110. Beginning at step 2602, the network controller 250 waits for a message.

When the network controller 250 receives a message that indicates device activation on the network 200, the process 2600 moves to step 2604, where the network controller 250 publishes an alert on the alert channel. The process 2600 then moves to step 2602 where the network controller 250 waits for the next message.

When the network controller 250 receives a message from the control channel, the process 2600 moves to step 2606 where the network controller 250 performs network signaling associated with the control channel message and at step 2608, the network controller 250 publishes a response to the control channel message on the control-response channel.

The process 2600 then moves to step 2602 where the network controller 250 waits for the next message.

Secure Hub Installation Via Existing Network Devices

If the network controller 250 that is installed on an existing network 200 fails, it may need to be replaced with a new network controller 250 that has no knowledge of the existing network configuration.

Figure 9:
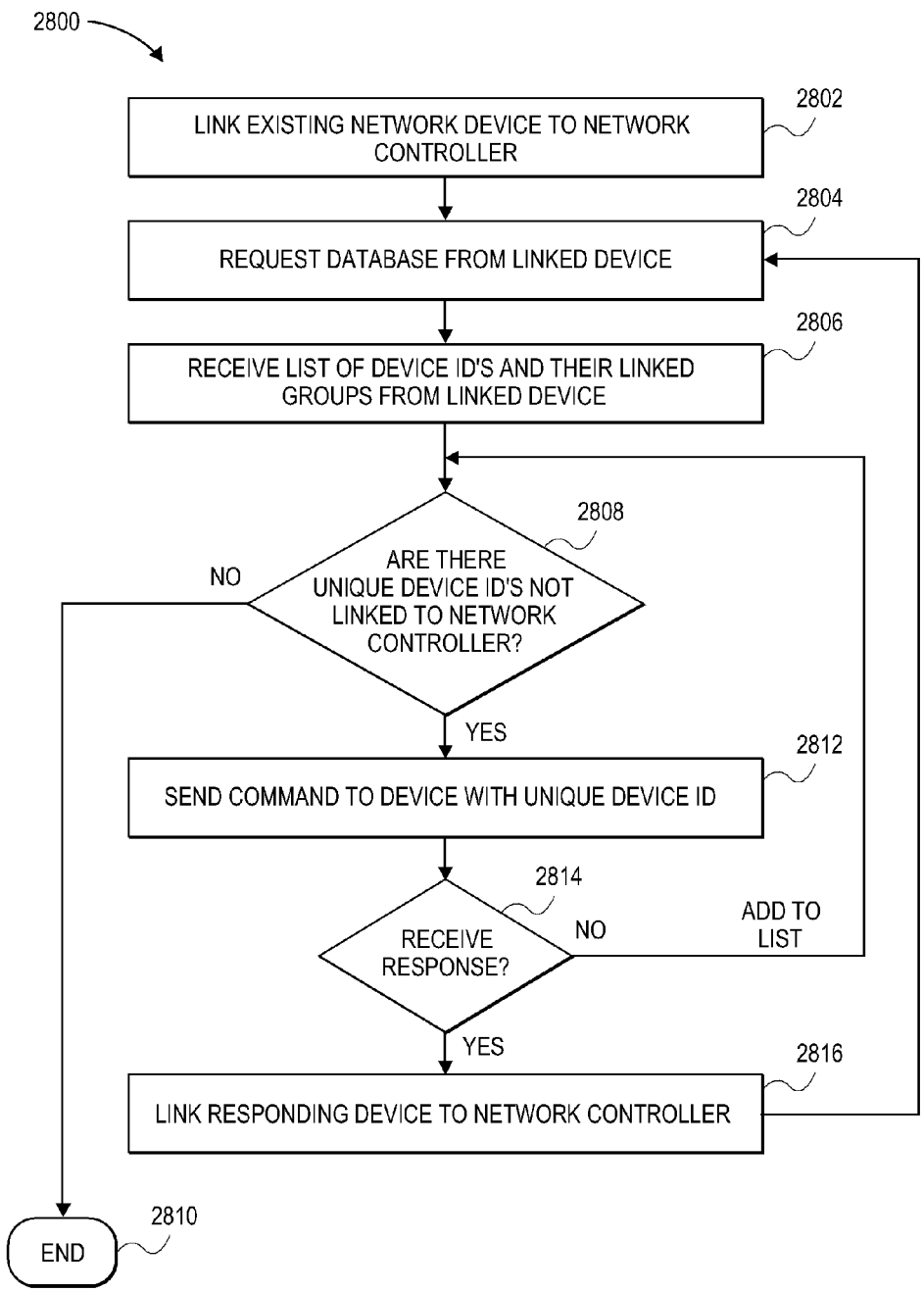
FIG. 9 illustrates a process to install the new network controller on the existing network, according to certain embodiments.

FIG. 9 illustrates a process 2800 to install the new network controller 250 with no knowledge of the network configuration on the existing network 200. Referring to FIGS. 1, 2, and 9, the process 2800 determines from the network 200 the identities of the existing network devices on the network 200 and recreates the network configuration. This provides an easy network controller replacement process for the user.

Beginning at step 2802, new network controller 250 connects to the network 200 and is associated and linked with a first network device 220. In an embodiment, the new network controller 250 requests a list of the unique identifiers associated with the network devices 220 on the network 200 from the connect server 130. The new network controller 250 sends a message comprising the unique identifier of a first network device 220 and links to the first network device 220.

In an embodiment, the first network device 220 comprises the network device 220 with the most network devices 220 linked to it, such as, for example, an ALL OFF button on a keypad. In another embodiment, the first network device 220 comprises any network device 220 that is linked to at least one other network device 220.

At step 2804, the new network controller 250 requests the database of the first network device 220. The database comprises a list of device identifiers of the network devices 220 that are linked to the first network device 220 as well as their associated group. For example, the switch 220SW is linked to the LED light 220LED; the door sensor 220SEN is linked to the LED light 220LED, and the LED light 220LED is linked to the switch 220SW and the door sensor 220SEN.

At step 2806, the new network controller 250 receives the linked list from the first device 220. In an embodiment, the new network controller 250 stores the received list.

At step 2808, the new network controller 250 determines whether there is a device 220 on the linked list that is not linked to the new network controller 250. When all of the devices 220 on the linked list have been linked to the new network controller 250, the process 2800 ends at step 2810. When there is a device 220 that is not linked to the new network controller 250, the process 2800 moves to step 2812.

At step 2812, the new network controller 250 sends a command to the unknown device 220 to link. At step 2814, the new network controller 250 waits for a response from the unknown device 220. If no response is received, such as for example, a response timer times out, the process 2800 records the device identifier associated with the unresponsive device 220 and returns to step 2808. In an embodiment, the user is notified of the unresponsive devices 220.

If a response is received, the new network controller 250 links to the responding device 220 at step 2816. In an embodiment, the new network controller 250 adds the unique device identifier of the responding device 220 to its linked list. The process 2800 returns to step 2804 where the process 2800 requests the database including the linked list stored in the responding device 220 until the new network controller 250 has crawled or spidered through all of the network devices 220 on the network 200.

In an embodiment, for each network device 220 found by the new network controller 250, the new network controller 250 initiates a request for additional device information, such as, for example, device category, device sub-category, firmware and hardware revision numbers, and the like. Device database record links downloaded that contain the network key of the previous network controller are used to initiate a new database record link with the network key of the new network controller 250 and a deletion of the network key of the previous network controller. This prevents excessive network traffic directed to network controllers that no longer exist on the network 200.

In an embodiment, at the end of the process 2800, the new network controller 250 has acquired the network configuration, and the user has a list of non-responding network devices 220 that may either be battery-powered or not present and may require further investigation. In an embodiment, the new network controller updates the list of linked network devices associated with the network and stored in the connect server 130 with any additional devices 220 found during the network controller installation process 2800.

Securely Install New Network Device with a Private Key Via Intelligent Device

In some embodiments, the intelligent device 110 can be used to securely install a new network device 220NEW onto the existing network 200 that is associated with a private key.

In an embodiment, the network controller 250 comprises a unique key. In an embodiment, the unique key is a random number, a function of one or more random numbers, and the like. In an embodiment, the unique key comprises an encryption code. In an embodiment, the unique key that is unique to the network controller 250 is stored in the network controller 250 during manufacture.

In the following discussion, the unique key that is unique to the network controller 250 is referred to as the hub key. In an embodiment, the hub key is included in messages sent between network devices 220 and between the network device 220 and the network controller 250 that identifies the sender as belonging to the network 200. The connect server database 1906 comprises a list of the hub key associated with the network controllers 250 for each network 200.

Prior to the installation process, the user installs an installation application onto the intelligent device 110.

Figure 10:
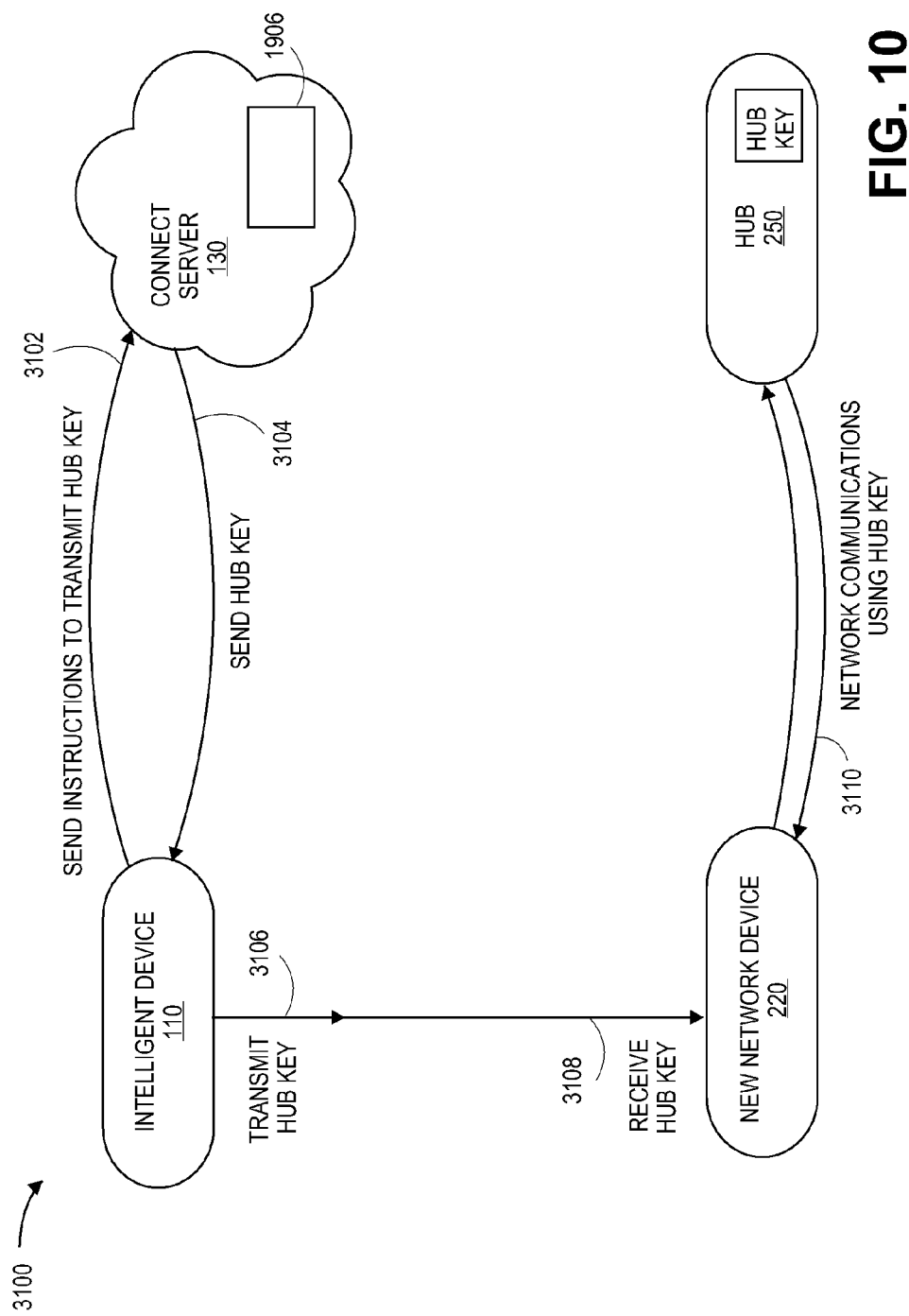
FIG. 10 illustrates a data flow diagram showing the transfer of information between an intelligent device, a connect server, a network controller, and a new network device to securely install the new network device on the network via the intelligent device, according to certain other embodiments.

FIG. 10 illustrates a data flow diagram 3100 showing the transfer of information between the intelligent device 110, the connect server 130 comprising the hub key in the database 1906, the network controller 250, and the new network device 220NEW to securely install the new network device 220NEW on the network 220 via the intelligent device 110.

In an embodiment, the connect server 130 is configured to communicate with the intelligent device 110 and the network controller 250 over communication channels of a communication network that is different the network 200.

At event 3102, the intelligent device 110 requests the hub key for the network 200 from the connect server 130 over the communication channels. In an embodiment, the intelligent device is remote from the network 200.

In an embodiment, the hub key is stored in the database 1906 of the connect server 130. At event 3104, the connect server 130 sends the hub key to the intelligent device 110 via the communication channels of the communication network.

At event 3106, the intelligent device 110 announces, broadcasts, or beacons information comprising at least the hub key over a third network that is different from the communication channels of the communication network and that is different from the network 200. At event 3108, the user activates the new device 220NEW and places the new device 220NEW in proximity to the beaconing intelligent device 110, where the new device 220NEW receives the at least the hub key broadcast from the intelligent device 110. In an embodiment, the user performs physical action to place the new device 220NEW and/or the intelligent device 110 in an enrollment mode or state. Examples of physical actions are pushing a button, switching a switch, entering a screen selection, or the like.

The second network can utilize a plurality of communication media. In an embodiment, the intelligent device 110 comprises a radio frequency (RF) transmitter configured to transmit an RF signal comprising at least the hub key. The new device 220NEW comprises an RF receiver configured to receive the RF signal and decode the hub key from the RF signal.

In another embodiment, the intelligent device 110 comprises an ultrasonic transmitter configured to transmit an ultrasonic signal comprising at least the hub key. The new device 220NEW comprises an ultrasonic receiver and is configured to receive the ultrasonic signal and decode the hub key from the ultrasonic signal.

In a further embodiment, the intelligent device 110 comprises an infrared (IR) transmitter configured to transmit an IR signal comprising at least the hub key. The new device 220NEW comprises an IR sensor and is configured to receive the IR signal and decode the hub key from the IR signal.

In a yet further embodiment, the intelligent device 110 comprises a light pulse generator and transmitter, such as a flash associated with the camera on a smartphone, for example, and is configured to transmit light pulses comprising at least the hub key. The new device 220NEW comprises an optical sensor and is configured to receive the light pulses and decode the hub key from the light pulses.

In an embodiment, the intelligent device 110 comprises tone generator and is configured to emit audible tones comprising at least the hub key. The new device 220NEW comprises an audio receiver, such as a microphone, for example, and is configured to receive the tones and decode the hub key from the tones.

At event 3110, the new device 220NEW announces itself to the existing network 220 using the hub key. The physically private process 3100 installs the new device 220NEW onto the network 200 without compromising the security of the network 200 as the hub key and any other sensitive network information are sent independently of the network 200 during the installation procedure.

Securely Install New Network Device with a Private Key Via Existing Network Device In some embodiments, an existing network device 220EXIST can be used to securely install a new network device 220NEW onto the existing network 200 that is associated with the private key.

In an embodiment, the network controller 250 comprises a unique key. In an embodiment, the unique key is a random number, a function of one or more random numbers, and the like. In an embodiment, the unique key comprises an encryption code. In an embodiment, the unique key that is unique to the network controller 250 is stored in the network controller 250 during manufacture.

In the following discussion, the unique key that is unique to the network controller 250 is referred to as the hub key. In an embodiment, the hub key is included in messages sent between installed network devices 220 and between the installed network devices 220 and the network controller 250 that identifies the sender as belonging to the network 200.

Figure 11:
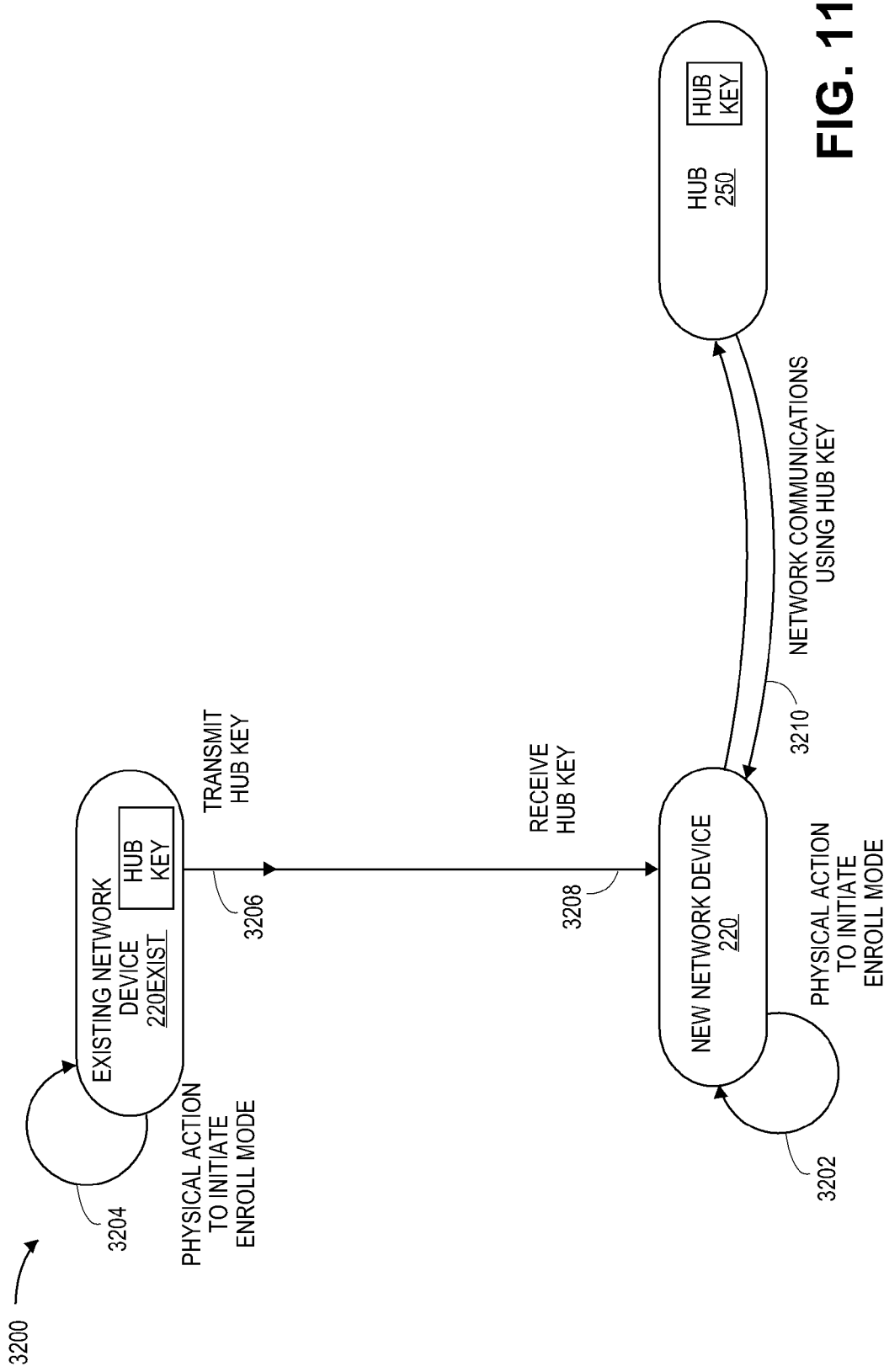
FIG. 11 illustrates a data flow diagram showing the transfer of information between a network controller, an existing network device, and a new network device to securely install the new network device on the network via the existing network device, according to certain other embodiments.

FIG. 11 illustrates a data flow diagram 3200 showing the transfer of information between the network controller 250, the existing or installed network device 220EXIST comprising the hub key, and the new network device 220NEW to securely install the new network device 220NEW onto the network 200 via the existing network device 220EXIST. In an embodiment, the existing network device 220EXIST can install the new network device 220NEW without the intelligent device 110. In a further embodiment, physical private communication abilities can be natively and inexpensively incorporated into the network devices 220. In a yet further embodiment, the physical private communication abilities can be incorporated into the network devices 220 during manufacture.

Beginning at event 3202, the user performs a physical action to the new device 220NEW to initiate an enrollment mode or state in the new device 220NEW and places the new network device 220NEW in proximity to the existing network device 220EXIST. Further, at event 3204, the user performs a physical action to the existing network device 220EXIST to initiate an enrollment mode or state in the existing network device 220EXIST. Examples of physical actions are depressing a button, switching a switch, or the like. The existing network device 220EXIST has knowledge of the hub key. In an embodiment, the network devices 220 comprise memory and the hub key is stored in the memory.

At event 3206, the existing network device 220EXIST announces, broadcasts, or beacons information comprising at least the hub key over a second network that is different from the network 200. The second network can utilize a plurality of communication media, such as, for example, RF, ultrasound, IR, light pulses, and audible tones.

In an embodiment, the existing network device 220EXIST comprises a radio frequency (RF) transmitter configured to transmit an RF signal comprising at least the hub key. The new device 220NEW comprises an RF receiver configured to receive the RF signal and decode the hub key from the RF signal.

In another embodiment, the existing network device 220EXIST comprises an ultrasonic transmitter configured to transmit an ultrasonic signal comprising at least the hub key. The new device 220NEW comprises an ultrasonic receiver and is configured to receive the ultrasonic signal and decode the hub key from the ultrasonic signal.

In a further embodiment, the existing network device 220EXIST comprises an infrared (IR) transmitter configured to transmit an IR signal comprising at least the hub key. The new device 220NEW comprises an IR sensor and is configured to receive the IR signal and decode the hub key from the IR signal.

In a yet further embodiment, the existing network device 220EXIST comprises a light pulse generator and transmitter, such as a flash associated with a camera, for example, and is configured to transmit light pulses comprising at least the hub key. The new device 220NEW comprises an optical sensor and is configured to receive the light pulses and decode the hub key from the light pulses.

In an embodiment, the existing network device 220EXIST comprises tone generator and is configured to emit audible tones comprising at least the hub key. The new device 220NEW comprises an audio receiver, such as a microphone, for example, and is configured to receive the tones and decode the hub key from the tones.

And at event 3208, the new network device 220NEW receives the information using the corresponding one of the RF receiver, ultrasound receiver, IR receiver, optical sensor, and audio sensor, as described above. The new device 220NEW decodes the information and stores the hub key.

At event 3210, the new device 220NEW announces itself to the existing network 220 using the hub key. The physically private process 3200 installs the new device 220NEW onto the network 200 without compromising the security of the network 200 as the hub key and any other sensitive network information are sent independently of the network 200 during the installation procedure.

Discover New Network Device Having a Device Key Via Intelligent Device

In some embodiments, the intelligent device 110 can be used to securely install a new network device 220NEW having a unique key onto the existing network 200. In an embodiment, each network device 220 and the network controller 250 comprise a unique key. In an embodiment, the unique key is a random number, a function of one or more random numbers, and the like. In an embodiment, the unique key comprises an encryption code. In an embodiment, a unique key that is unique to the individual device is stored in each network device 220 and network controller 250, respectively, during manufacture.

In the following discussion, the unique key that is unique to the network device 220 is referred to as the device key and the unique key that is unique to the network controller is referred to as the hub key. The device key identifies communications to or from the specific network device 220 associated with the device key over the network 200, while the hub key identifies communications on the network 200 comprising the network controller 250 that is associated with the hub key.

Prior to the installation process, the user installs an installation application onto the intelligent device 110.

Figure 12:
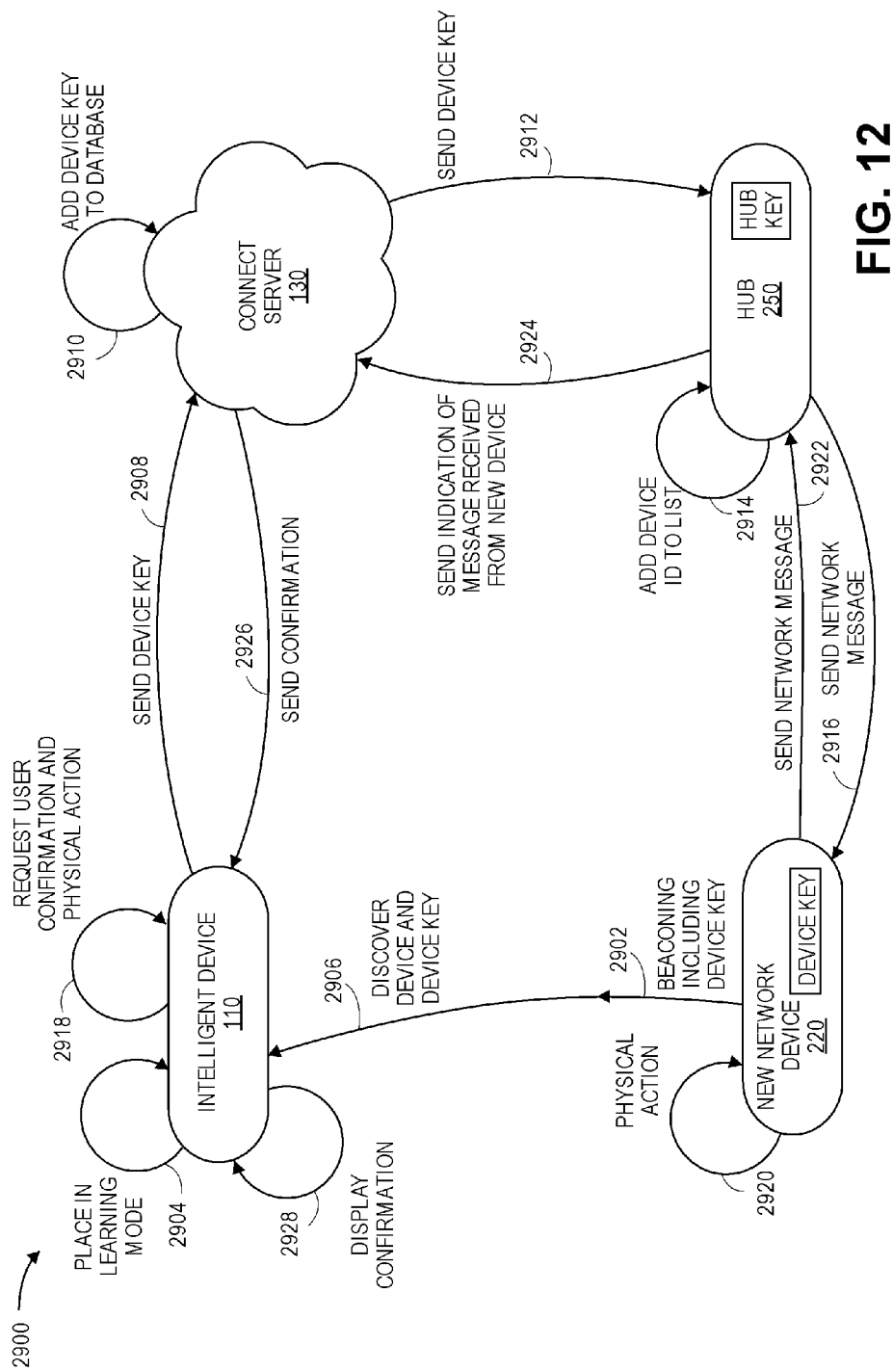
FIG. 12 illustrates a data flow diagram showing the transfer of information between an intelligent device, a connect server, a network controller, and a new network device to securely install the new network device on the network via the intelligent device, according to certain embodiments.

FIG. 12 illustrates a data flow diagram 2900 showing the transfer of information between the intelligent device 110, the connect server 130, the network controller 250 comprising the hub key, and the new network device 220NEW comprising the device key to securely install the new network device 220NEW on the network 220 via the intelligent device 110.

Beginning at event 2902, the user activates the new device 220NEW and the new device 220NEW periodically announces, broadcasts, or beacons information comprising at least its device key. At event 2904, the user places the intelligent device 110 in a learning mode and places the intelligent device 110 in proximity to the beaconing device 220NEW.

At event 2906, the intelligent device 110 discovers the beaconing device 220NEW. The intelligent device 110 reads at least the device key from the information being broadcast from the new network device 220NEW. In an embodiment, events 2902 and 2906 take place over a first network between the new network device 220NEW and the intelligent device 110 that is different from the network 200. In an embodiment, the intelligent device 110 stores the device key.

In an embodiment, the new network device 220NEW comprises a radio frequency (RF) transmitter configured to transmit an RF signal comprising at least the device key. The intelligent device 110 comprises an RF receiver configured to receive the RF signal and decode the device key from the RF signal.

In another embodiment, the new network device 220NEW comprises an ultrasonic transmitter configured to transmit an ultrasonic signal comprising at least the device key. The intelligent device 110 comprises an ultrasonic receiver and is configured to receive the ultrasonic signal and decode the device key from the ultrasonic receiver.

In a further embodiment, the new network device 220NEW comprises an infrared (IR) transmitter configured to transmit an IR signal comprising at least the device key. The intelligent device 110 comprises an IR sensor and is configured to receive the IR signal and decode the device key from the IR signal.

In a yet further embodiment, the new network device 220NEW comprises a light pulse generator and transmitter configured to transmit light pulses comprising at least the device key. The intelligent device 110 comprises an optical sensor, such as a camera on a smartphone, for example, and is configured to receive the light pulses and decode the device key from the light pulses.

In an embodiment, the new network device 220NEW comprises tone generator and is configured to emit audible tones comprising at least the device key. The intelligent device 110 comprises an audio receiver, such as a microphone on a smartphone, for example, and is configured to receive the tones and decode the device key from the tones.

In another embodiment, the new network device 220NEW comprises a watermark or a barcode, typically on its surface, where the watermark or the barcode comprises at least the device key. The intelligent device 110 is configured to read the watermark or the barcode. For example, the camera on a smartphone reads the watermark or the barcode. The intelligent device 110 is further configured to decode the device key from the watermark or the barcode, respectively.

In other embodiments, the intelligent device 110 comprises the announcing, broadcasting, or beaconing device searching for the new network device 220NEW and the new network device 220NEW comprises the receiving device receiving the signal from the intelligent device 110.

At event 2908, the intelligent device 110 sends at least the device key of the new device 220NEW to the connect server 130, where at event 2910, the connect server 130 stores at least the device key in its database 1906. In another embodiment, the device keys of the network devices 220 are stored in the database 1906 and the connect server 130 confirms that the received device key is a valid device key. At event 2912, the connect server 130 sends at least the device key of the new device 220NEW to the network controller 250.

In an embodiment, the connect server 130 is configured to communicate with the intelligent device 110 and the network controller 250 over communication channels of a communication network that is different from the first network between the intelligent device 110 and the new network device 220NEW and different from the network 200.

At event 2914, the network controller 250 adds at least the device key to its linked list of devices 220 on the network 200.

At event 2916, the network controller 250 sends a message to the new device 220NEW comprising the hub key using the device key. In other words, the network controller 250 send a message to the new network device 220NEW using the device key where the message is formatted to deliver the hub key to the new network device 220NEW. The device key permits the new device 220NEW to recognize that the message is for it and the message instructs the new device 220NEW use the hub key when communicating on the network 200. In an embodiment, the new device 220NEW substitutes the hub key for the device key for communications on the network 200.

In an embodiment, the intelligent device 110 presents a request to the user to perform a physical action at event

2918. At event 2920, the user performs the physical action. For example, the user pushes a button or switches a switch on the new network device 220NEW. At event 2922, in response to the physical action, the new network device 220NEW sends a network message using the hub key, which is received by the network controller 250 and the other network devices 220.

At event 2924, the network controller 250 send an indication of the message received from the new device 220NEW to the connect server 130, and at event 2926, the connect server 130 sends a confirmation to the intelligent device 110 indicating that the new device 220NEW successfully installed on the network 200. At event 2928, the intelligent device 110 presents the confirmation to the user. For example, the intelligent device 110 displays a message, emits an audible tone, or the like.

Thus, the new device 220NEW is installed onto the network 200 without compromising the security of the network 200 because the unique device identifier or device identifier and any other sensitive network information are sent independently of the network 200 during the installation procedure.

Install a New Network Device Via a Cloud Server

In some embodiments, the connect server 130 can be used to securely install a new network device 220NEW having a unique device identifier onto the existing network 200. In an embodiment, each network device 220 comprises a unique device identifier. The unique device identifier can be a random number that is stored in the memory of the network device. In an embodiment, the unique device identifier is stored during manufacture.

As described above, each network device 220 and the network controller 250 comprise a unique key. In an embodiment, the unique key is a random number, a function of one or more random numbers, and the like. In an embodiment, the unique key comprises an encryption code. In an embodiment, a unique key that is unique to the individual device is stored in each network device 220 and network controller 250, respectively, during manufacture.

In the following discussion, the unique key that is unique to the network device 220 is referred to as the device key and the unique key that is unique to the network controller is referred to as the hub key. The device key identifies communications to or from the specific network device 220 associated with the device key over the network 200, while the hub key identifies communications on the network 200 comprising the network controller 250 that is associated with the hub key.

In an embodiment, the unique device identifier is not the same as the device key. Thus, the network devices 220 comprises the unique identifier and a unique device key, where the unique identifier is used to identify the device and the unique device key is used to encrypt communication on the network to and from the network device 220 associated with the device key.

Further, the connect server database 1906 comprises a list of the device keys and the corresponding unique device identifier. In an embodiment, the connect server 130 associates the unique device identifier with the corresponding device key. By looking up the device identifier in the database 1906, the connect server 130 can retrieve the device key.

In a further embodiment, the connect server 130 associates one or more device characteristics, such as, for example, device type (light, switch, keypad, door sensor, etc.), manufacture date, software version, and the like with the unique device identifier.

Prior to the installation process, the user installs an installation application onto the intelligent device 110.

Figure 13:
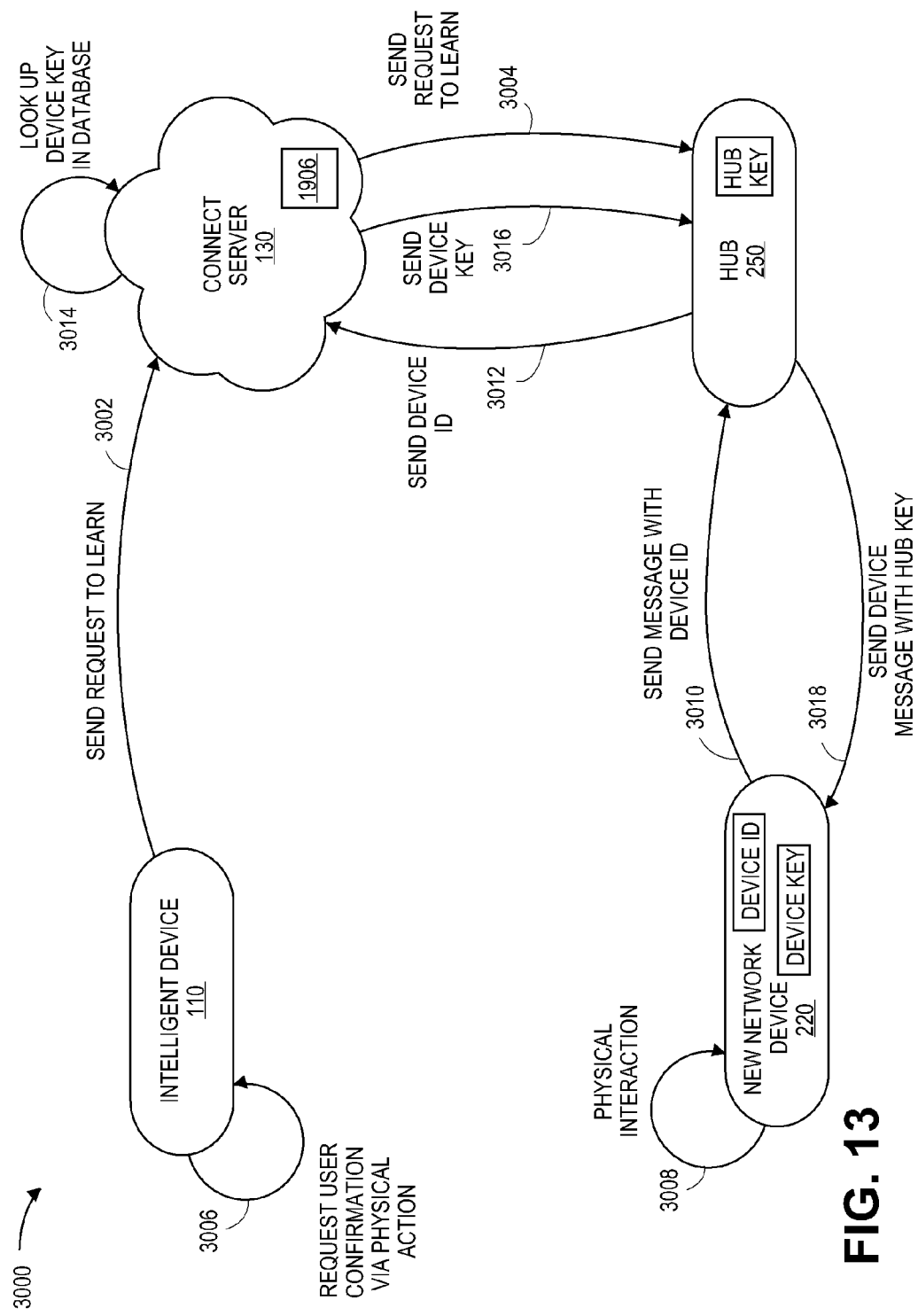
FIG. 13 illustrates a data flow diagram showing the transfer of information between an intelligent device, a connect server, a network controller, and a new network device to securely install the new network device on the network via the connect server, according to certain embodiments.

FIG. 13 illustrates a data flow diagram 3000 showing the transfer of information between the intelligent device 110 running the installation application, the connect server 130 comprising the database 1906, the network controller 250 associated with the hub key, and the new network device 220NEW associated with the device key and the device identifier to securely install the new network device 220NEW on the network 220.

Beginning at event 3002, the intelligent device 110 sends a request to learn to the connect server 130 and the connect server 130, at event 3004, passes the request to learn to the network controller 250. In an embodiment, the connect server 130 is configured to communicate with the intelligent device 110 and the network controller 250 over communication channels of a communication network that is different from the network 200.

At event 3006, the intelligent device 110 presents a request to the user to perform a physical action with the new device 220NEW. The physical action places the new network device 220NEW into linking mode. And at event 3008, the user performs the physical action with the new device 220NEW. In an embodiment, the physical action comprises switching a switch, pressing a button, or the like.

At event 3010, the new network device 220NEW send an unencrypted message including the unique device identifier generated at the factory to the network controller 250 over the network 200. And at event 3012, the network controller 250 passes the message with the unique device identifier to the connect server 130 over the communication channels of the communication network.

At event 3014, the connect server 130 looks up the device key associated with the new device 220NEW based on the unique device identifier in the database 1906.

At event 3016, the connect server 130 sends the device key to the network controller 250 over the communication channels of the communication network. At event 3018, the network controller 250 sends a message to the new device 220NEW using the device key that includes the hub key. In other words, the network controller 250 send a message to the new network device 220NEW using the device key where the message is formatted to deliver the hub key to the new network device 220NEW. The device key permits the new device 220NEW to recognize that the message is for it and the message instructs the new device 220NEW use the hub key when communicating on the network 200. In an embodiment, the new device 220NEW substitutes the hub key for the device key for communications on the network 200.

As described above with respect to FIG. 12, the new device 220NEW can send a message using the hub key to the network controller 250 to indicate successful installation. The network controller 250 can relay the successful installation to through connect server 130 via the communication channels of communication network to the intelligent device 110, which can display an indication to the user.

Thus, the new device 220NEW is installed onto the network 200 without compromising the security of the network 200 because device key is sent via the connect server 130 through the communication channels of the communication network during the installation procedure where the communication network is independent of the network 200.

Network

Figure 14:
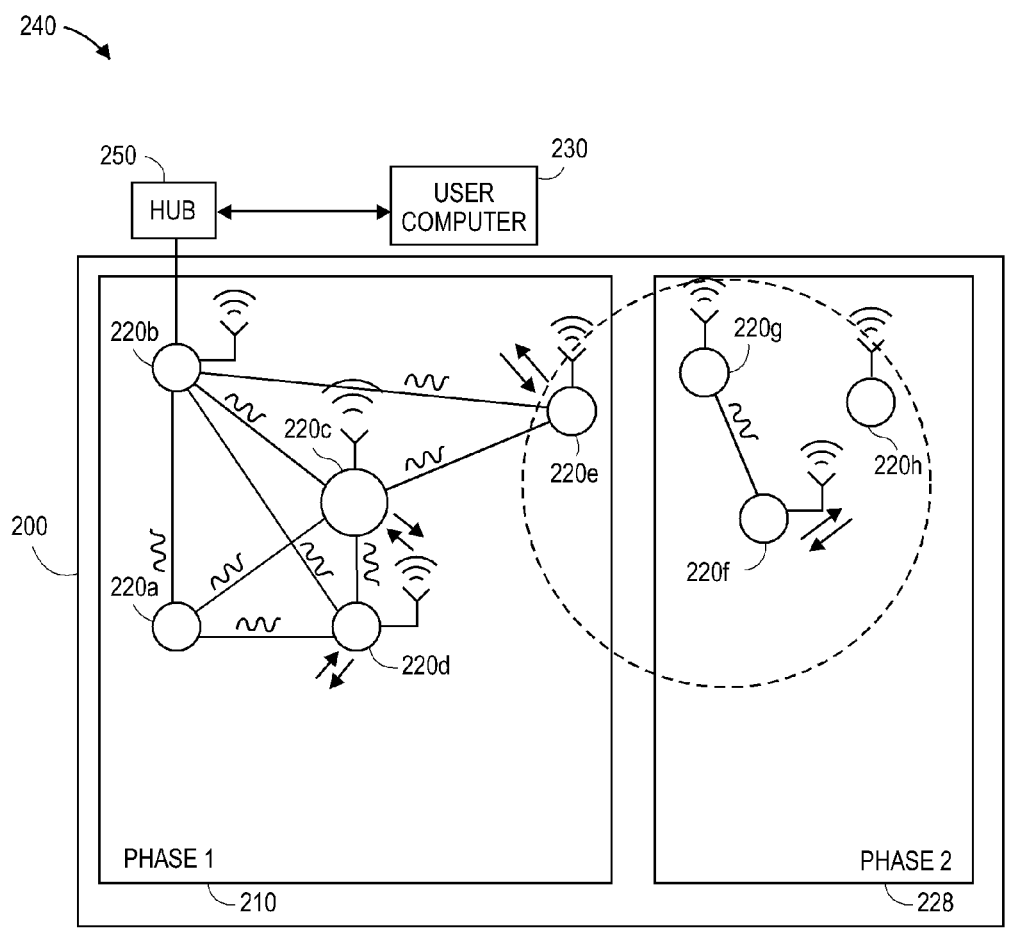
FIG. 14 is a block diagram of a powerline and radio frequency (RF) communication network, according to certain embodiments.

FIG. 14 illustrates an embodiment of a communication system 240 comprising the network 200, the network controller or hub 250 and the user computer 230. The communication system 240 is configured to propagate data and/or commands from the network controller or hub 250 to network devices 220 and to propagate messages from the network devises 220 to the network controller or hub 250.

In an embodiment, the network 200 comprises a dual-band mesh area networking topology to communicate with devices 220 located within the network 200. In an embodiment, the network 200 comprises an INSTEON® network utilizing an INSTEON® engine employing a powerline protocol and an RF protocol. The network devices 220 can comprise, for example, light switches, thermostats, motion sensors, and the like. INSTEON® devices are peers, meaning each network device 220 can transmit, receive, and repeat any message of the INSTEON® protocol, without requiring a master controller or routing software.

FIG. 14 illustrates the communication network 200 of control and communication devices 220 communicating over the network 200 using one or more of powerline signaling and RF signaling. In an embodiment, the communication network 200 comprises a mesh network. In another embodiment, the communication network 200 comprises a simulcast mesh network. In a further embodiment, the communication network 200 comprises an INSTEON® network.

Electrical power is most commonly distributed to buildings and homes in North America as single split-phase alternating current. At the main junction box to the building, the three-wire single-phase distribution system is split into two two-wire 110 VAC powerlines, known as Phase 1 and Phase 2. Phase 1 wiring is typically used for half the circuits in the building and Phase 2 is used for the other half. In the exemplary network 200, network devices 220a-220e are connected to a Phase 1 powerline 210 and network devices 220f-220h are connected to a Phase 2 powerline 228.

In the network 200, network device 220a is configured to communicate over the powerline; network device 220h is configured to communicate via RF; and network devices 220b-220g are configured to communicate over the powerline and via RF. Additionally network device 220b can be configured to communicate to the network controller or hub 250 and the network controller or hub 250 can be configured to communicate with the computer 230 and other digital equipment using, for example, RS232, USB, IEEE 802.3, or Ethernet protocols and communication hardware. The network controller or hub 250 on the network 200 communicating with the computer 230 and other digital devices can, for example, bridge to networks of otherwise incompatible devices in a building, connect to computers, act as nodes on a local-area network (LAN), or get onto the global Internet. In an embodiment, the computer 230 comprises a personal computer, a laptop, a tablet, a smartphone, or the like, and interfaces with a user. The network controller or hub 250 can further be configured to provide information to a user through the computer 230.

In an embodiment, network devices 220a-220g that send and receive messages over the powerline use the INSTEON® Powerline protocol, and network devices 220b-220h that send and receive radio frequency (RF) messages use the INSTEON® RF protocol, as defined in U.S. Pat. Nos. 7,345,998 and 8,081,649 which are hereby incorporated by reference herein in their entireties. INSTEON® is a trademark of the applicant.

Network devices 220b-220h that use multiple media or layers solve a significant problem experienced by devices that only communicate via the powerline, such as network device 220a, or by devices that only communicate via RF, such as network device 220h. Powerline signals on opposite powerline phases 210 and 228 are severely attenuated because there is no direct circuit connection for them to travel over. RF barriers can prevent direct RF communication between devices RF only devices. Using devices capable of communicating over two or more of the communication layers solves the powerline phase coupling problem whenever such devices are connected on opposite powerline phases and solves problems with RF barriers between RF devices. Thus, within the network 200, the powerline layer assists the RF layer, and the RF layer assists the powerline layer.

As shown in FIG. 14, network device 220a is installed on powerline Phase 1 210 and network device 220f is installed on powerline Phase 2 228. Network device 220a can communicate via powerline with network devices 220b-220e on powerline Phase 1 210, but it can also communicate via powerline with network device 220f on powerline Phase 2 228 because it can communicate over the powerline to network device 220e, which can communicate to network device 220f using RF signaling, which in turn is directly connected to powerline Phase 2 228. The dashed circle around network device 220f represents the RF range of network device 220f. Direct RF paths between network devices 220e to 220f (1 hop), for example, or indirect paths between network devices 220c to 220e and between network devices 220e to 220f, for example (2 hops) allow messages to propagate between the powerline phases.

Each network device 220a-220h is configured to repeat messages to others of the network devices 220a-220h on the network 200. In an embodiment, each network device 220a-220h is capable of repeating messages, using the protocols as described herein. Further, the network devices 220a-220h are peers, meaning that any device can act as a master (sending messages), slave (receiving messages), or repeater (relaying messages). Adding more devices configured to communicate over more than one physical layer increases the number of available pathways for messages to travel. Path diversity results in a higher probability that a message will arrive at its intended destination.

For example, RF network device 220d desires to send a message to network device 220e, but network device 220e is out of range. The message will still get through, however, because devices within range of network device 220d, such as network devices 220a-220c will receive the message and repeat it to other devices within their respective ranges. There are many ways for a message to travel: network device 220d to 220c to 220e (2 hops), network device 220d to 220a to 220c to 220e (3 hops), network device 220d to 220b to 220a to 220c to 220e (4 hops) are some examples.

Figure 15:
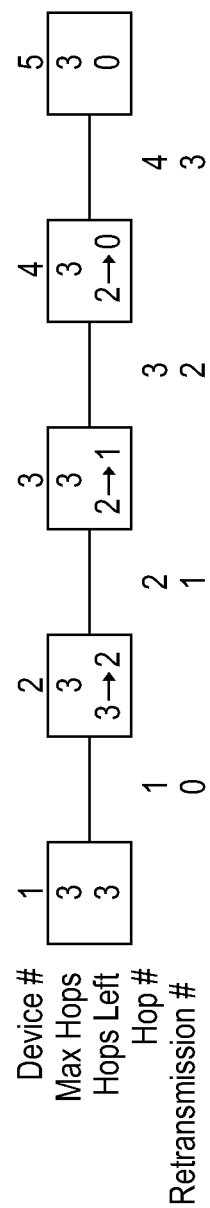
FIG. 15 is a block diagram illustrating message retransmission within the network, according to certain embodiments.

FIG. 15 is a block diagram illustrating message retransmission within the communication network 200. In order to improve network reliability, the network devices 220 retransmit messages intended for other devices on the network 200. This increases the range that the message can travel to reach its intended device recipient.

Unless there is a limit on the number of hops that a message may take to reach its final destination, messages might propagate forever within the network 200 in a nested series of recurring loops. Network saturation by repeating messages is known as a "data storm." The message protocol avoids this problem by limiting the maximum number of hops an individual message may take to some small number. In an embodiment, messages can be retransmitted a maximum of three times. In other embodiments, the number of times a message can be retransmitted is less than 3. In further embodiments, the number of times a message can be retransmitted is greater than 3. The larger the number of retransmissions, however, the longer the message will take to complete.

Embodiments comprise a pattern of transmissions, retransmissions, and acknowledgements that occurs when messages are sent. Message fields, such as Max Hops and Hops Left manage message retransmission. In an embodiment, messages originate with the 2-bit Max Hops field set to a value of 0, 1, 2, or 3, and the 2-bit Hops Left field set to the same value. A Max Hops value of zero tells other network devices 220 within range not to retransmit the message. A higher Max Hops value tells network devices 220 receiving the message to retransmit it depending on the Hops Left field. If the Hops Left value is one or more, the receiving device 220 decrements the Hops Left value by one and retransmits the message with the new Hops Left value. Network devices 220 that receive a message with a Hops Left value of zero will not retransmit that message. Also, the network device 220 that is the intended recipient of a message will not retransmit the message, regardless of the Hops Left value.

In other words, Max Hops is the maximum retransmissions allowed. All messages "hop" at least once, so the value in the Max Hops field is one less than the number of times a message actually hops from one device to another. In embodiments where the maximum value in this field is three, there can be four actual hops, comprising the original transmission and three retransmissions. Four hops can span a chain of five devices. This situation is shown schematically in FIG. 15.

Figure 16:
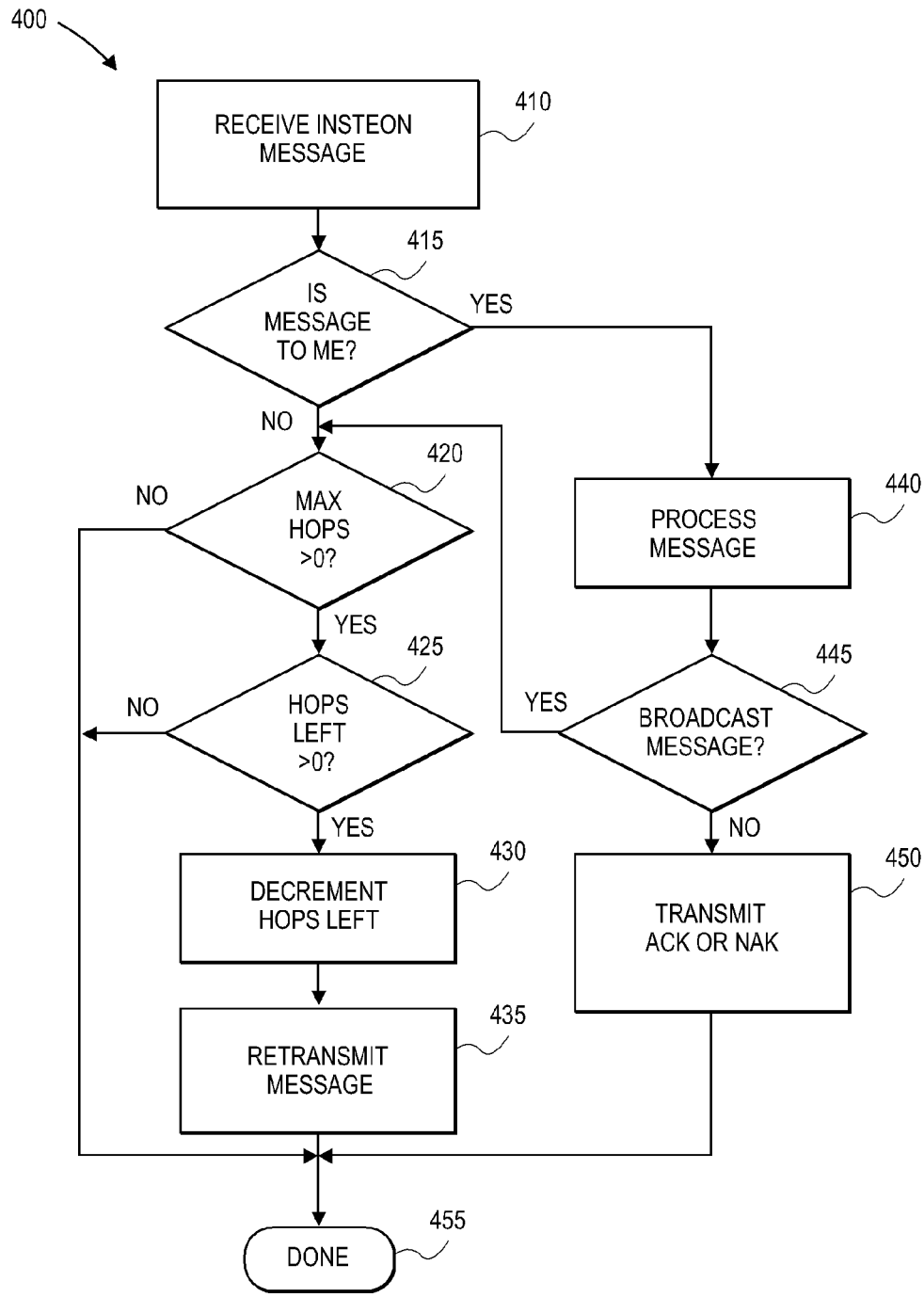
FIG. 16 illustrates a process to receive messages within the network, according to certain embodiments.

FIG. 16 illustrates a process 400 to receive messages within the communication network 200. The flowchart in FIG. 16 shows how the network device 220 receives messages and determines whether to retransmit them or process them. At step 410, the network device 220 receives a message via powerline or RF.

At step 415, the process 400 determines whether the network device 220 needs to process the received message. The network device 220 processes Direct messages when the network device 220 is the addressee, processes Group Broadcast messages when the network device 220 is a member of the group, and processes all Broadcast messages.

If the received message is a Direct message intended for the network device 220, a Group Broadcast message where the network device 220 is a group member, or a Broadcast message, the process 400 moves to step 440. At step 440, the network device 220 processes the received message.

At step 445, the process 400 determines whether the received message is a Group Broadcast message or one of a Direct message and Direct group-cleanup message. If the message is a Direct or Direct Group-cleanup message, the process moves to step 450. At step 450, the device sends an acknowledge (ACK) or a negative acknowledge (NAK) message back to the message originator in step 450 and ends the task at step 455.

In an embodiment, the process 400 simultaneously sends the ACK/NAK message over the powerline and via RF. In another embodiment, the process 400 intelligently selects which physical layer (powerline, RF) to use for ACK/NAK message transmission. In a further embodiment, the process 400 sequentially sends the ACK/NAK message using a different physical layer for each subsequent retransmission.

If at step 445, the process 400 determines that the message is a Broadcast or Group Broadcast message, the process 400 moves to step 420. If, at step 415, the process 400 determines that the network device 220 does not need to process the received message, the process 400 also moves to step 420. At step 420, the process 400 determines whether the message should be retransmitted.

At step 420, the Max Hops bit field of the Message Flags byte is tested. If the Max Hops value is zero, process 400 moves to step 455, where it is finished. If the Max Hops filed is not zero, the process 400 moves to step 425, where the Hops Left filed is tested.

If there are zero Hops Left, the process 400 moves to step 455, where it is finished. If the Hops Left field is not zero, the process 400 moves to step 430, where the process 400 decrements the Hops Left value by one.

At step 435, the process 400 retransmits the message. In an embodiment, the process 400 simultaneously retransmits the message over the powerline and via RF. In another embodiment, the process 400 intelligently selects which physical layer (PL, RF) to use for message retransmission. In a further embodiment, the process 400 sequentially retransmits the message using a different physical layer for each subsequent retransmission.

FIG. 17 illustrates a process 500 to transmit messages to multiple recipient devices 220 in a group within the communication network 200. Group membership is stored in a database in the network device 220 following a previous enrollment process. At step 510, the network device 220 first sends a Group Broadcast message intended for all members of a given group. The Message Type field in the Message Flags byte is set to signify a Group Broadcast message, and the To Address field is set to the group number, which can range from 0 to 255. The network device 220 transmits the message using at least one of powerline and radio frequency signaling. In an embodiment, the network device 220 transmits the message using both powerline and radio frequency signaling.

Following the Group Broadcast message, the transmitting device 220 sends a Direct Group-cleanup message individually to each member of the group in its database. At step 515, the network device 220 first sets the message To Address to that of the first member of the group, then it sends a Direct Group-cleanup message to that addressee at step 520. If Group-cleanup messages have been sent to every member of the group, as determined at step 525, transmission is finished at step 535. Otherwise, at step 530, the network device 220 sets the message To Address to that of the next member of the group and sends the next Group-cleanup message to that addressee at step 520.

FIG. 18 illustrates a process 600 to transmit direct messages with retries to the network device 220 within the communication network 200. Direct messages can be retried multiple times if an expected ACK is not received from the addressee. The process begins at step 610.

At step 615, the network device 220 sends a Direct or a Direct Group-cleanup message to an addressee. At step 620, the network device 220 waits for an Acknowledge message from the addressee. If, at step 625, an Acknowledge message is received and it contains an ACK with the expected status, the process 600 is finished at step 645.

If, at step 625, an Acknowledge message is not received, or if it is not satisfactory, a Retry Counter is tested at step 630. If the maximum number of retries has already been attempted, the process 600 fails at step 645. In an embodiment, network devices 220 default to a maximum number of retries of five. If fewer than five retries have been tried at step 630, the network device 220 increments its Retry Counter at step 635. At step 640, the network device 220 will also increment the Max Hops field in the Message Flags byte, up to a maximum of three, in an attempt to achieve greater range for the message by retransmitting it more times by more network devices 220. The message is sent again at step 615.

Figure 19:
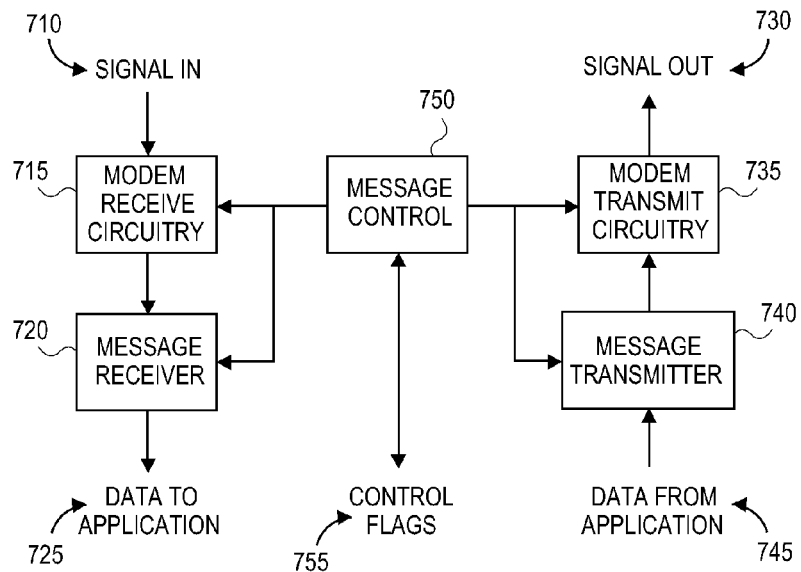
FIG. 19 is a block diagram illustrating the overall flow of information related to sending and receiving messages over the network, according to certain embodiments.

The network devices 220 comprise hardware and firmware that enable the network devices 220 to send and receive messages. FIG. 19 is a block diagram of the network device 220 illustrating the overall flow of information related to sending and receiving messages. Received signals 710 come from the powerline, via radio frequency, or both. Signal conditioning circuitry 715 processes the raw signal and converts it into a digital bitstream. Message receiver firmware 720 processes the bitstream as required and places the message payload data into a buffer, which is available to the application running on the network device 220. A message controller 750 tells the application that data 725 is available using control flags 755.

To send a message, the application places message data 745 in a buffer, then tells the message controller 750 to send the message using the control flags 755. Message transmitter 740 processes the message into a raw bitstream, which it feeds to a modem transmitter 735. The modem transmitter 735 sends the bitstream 730 as a powerline signal, a radio frequency signal, or both.

Figure 20:
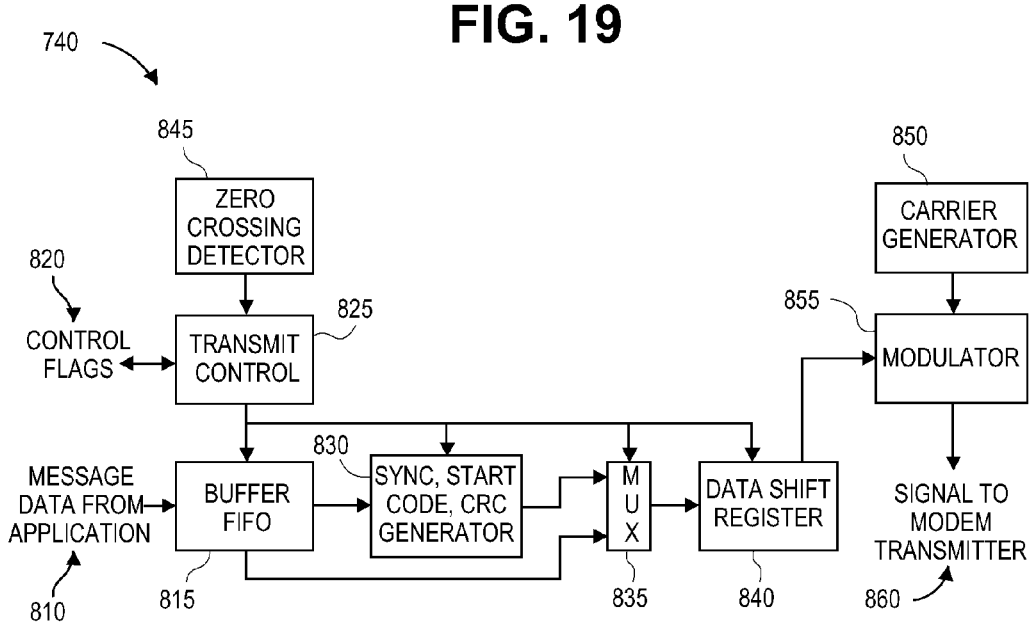
FIG. 20 is a block diagram illustrating the overall flow of information related to transmitting messages on the powerline, according to certain embodiments.

FIG. 20 shows the message transmitter 740 of FIG. 19 in greater detail and illustrates the network device 220 sending a message on the powerline. The application first composes a message 810 to be sent, excluding the cyclic redundancy check (CRC) byte, and puts the message data in a transmit buffer 815. The application then tells a transmit controller 825 to send the message by setting appropriate control flags 820. The transmit controller 825 packetizes the message data using multiplexer 835 to put sync bits and a start code from a generator 830 at the beginning of a packet followed by data shifted out of the first-in first-out (FIFO) transmit buffer 815.

As the message data is shifted out of FIFO transmit buffer 815, the CRC generator 830 calculates the CRC byte, which is appended to the bitstream by the multiplexer 835 as the last byte in the last packet of the message. The bitstream is buffered in a shift register 840 and clocked out in phase with the powerline zero crossings detected by zero crossing detector 845. The phase shift keying (PSK) modulator 855 shifts the phase of an approximately 131.65 kHz carrier signal from carrier generator 850 by approximately 180 degrees for zero-bits, and leaves the carrier signal unmodulated for one-bits. In other embodiments, the carrier signal can be greater than or less than approximately 131.65 kHz. Note that the phase is shifted gradually over one carrier period as disclosed in conjunction with FIG. 23. Finally, the modulated carrier signal 860 is applied to the powerline by the modem transmit circuitry 735 of FIG. 19.

Figure 21:
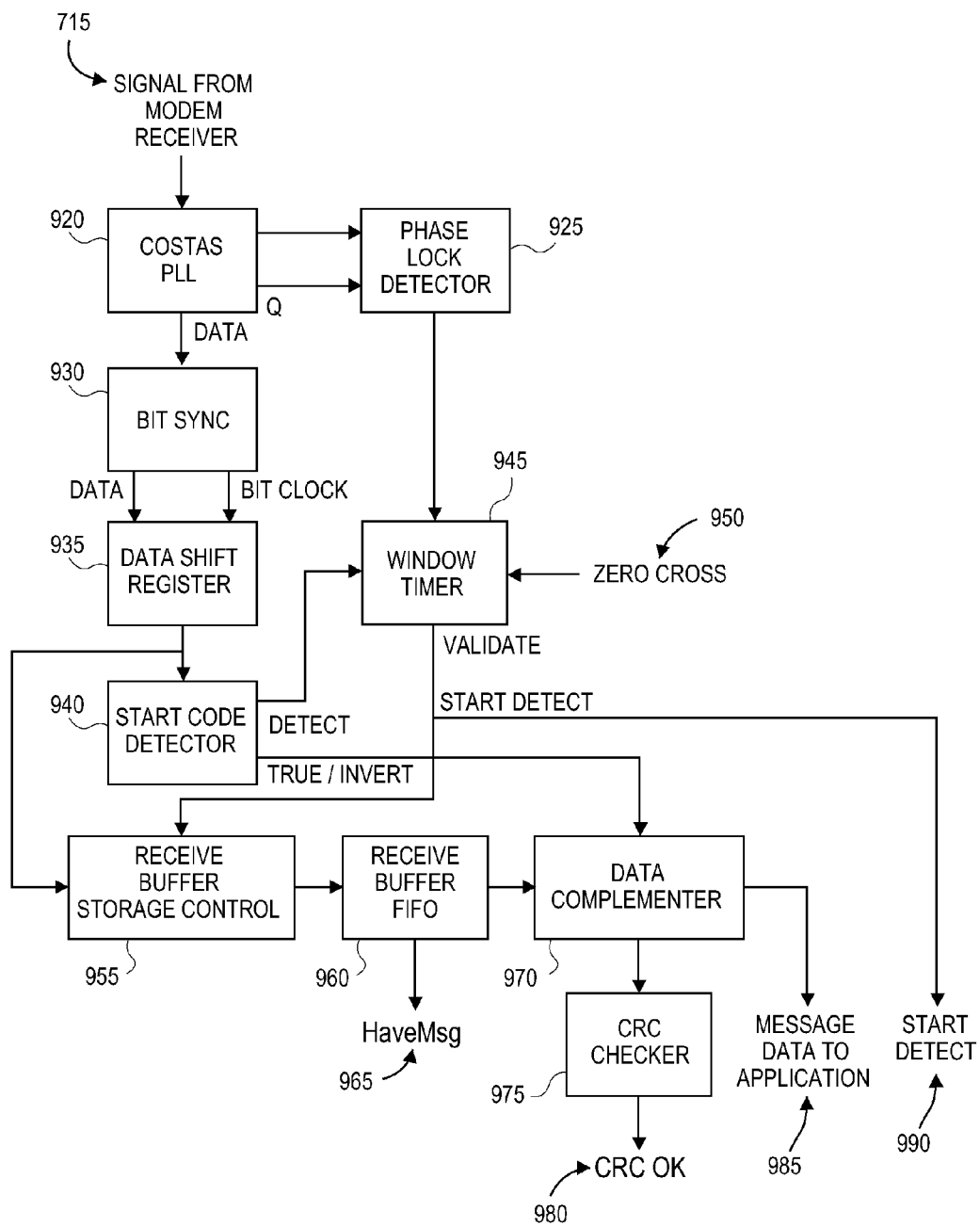
FIG. 21 is a block diagram illustrating the overall flow of information related to receiving messages from the powerline, according to certain embodiments.

FIG. 21 shows message receiver 720 of FIG. 19 in greater detail and illustrates the network device 220 receiving a message from the powerline. The modem receive circuitry 715 of FIG. 19 conditions the signal on the powerline and transforms it into a digital data stream that the firmware in FIG. 21 processes to retrieve messages. Raw data from the powerline is typically very noisy, because the received signal amplitude can be as low as only few millivolts, and the powerline often carries high-energy noise spikes or other noise of its own. Therefore, in an embodiment, a Costas phase-locked-loop (PLL) 920, implemented in firmware, is used to find the PSK signal within the noise. Costas PLLs, well known in the art, phase-lock to a signal both in phase and in quadrature. A phase-lock detector 925 provides one input to a window timer 945, which also receives a zero crossing signal 950 and an indication that a start code in a packet has been found by start code detector 940.

Whether it is phase-locked or not, the Costas PLL 920 sends data to the bit sync detector 930. When the sync bits of alternating ones and zeroes at the beginning of a packet arrive, the bit sync detector 930 will be able to recover a bit clock, which it uses to shift data into data shift register 935. The start code detector 940 looks for the start code following the sync bits and outputs a detect signal to the window timer 945 after it has found one. The window timer 945 determines that a valid packet is being received when the data stream begins approximately 800 microseconds before the powerline zero crossing, the phase lock detector 925 indicates lock, and detector 940 has found a valid start code. At that point the window timer 945 sets a start detect flag 990 and enables the receive buffer controller 955 to begin accumulating packet data from shift register 935 into the FIFO receive buffer 960. The storage controller 955 insures that the FIFO 960 builds up the data bytes in a message, and not sync bits or start codes. It stores the correct number of bytes, 10 for a standard message and 24 for an extended message, for example, by inspecting the Extended Message bit in the Message Flags byte. When the correct number of bytes has been accumulated, a HaveMsg flag 965 is set to indicate a message has been received.

Costas PLLs have a phase ambiguity of 180 degrees, since they can lock to a signal equally well in phase or anti-phase. Therefore, the detected data from PLL 920 may be inverted from its true sense. The start code detector 940 resolves the ambiguity by looking for the true start code, C3 hexadecimal, and also its complement, 3C hexadecimal. If it finds the complement, the PLL is locked in antiphase and the data bits are inverted. A signal from the start code detector 940 tells the data complementer 970 whether to un-invert the data or not. The CRC checker 975 computes a CRC on the received data and compares it to the CRC in the received message. If they match, the CRC OK flag 980 is set.

Data from the complementer 970 flows into an application buffer, not shown, via path 985. The application will have received a valid message when the HaveMsg flag 965 and the CRC OK flag 980 are both set.

Figure 22:
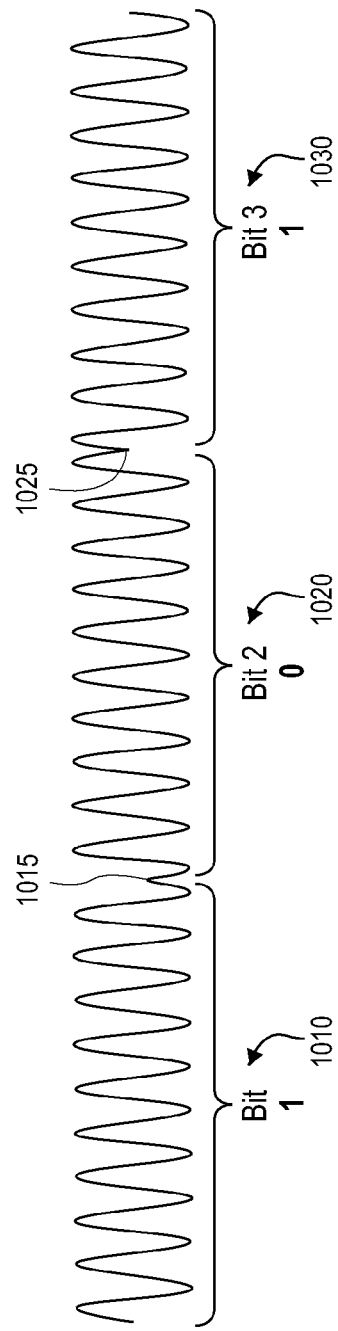
FIG. 22 illustrates a powerline signal, according to certain embodiments.

FIG. 22 illustrates an exemplary 131.65 kHz powerline carrier signal with alternating BPSK bit modulation. Each bit uses ten cycles of carrier. Bit 1010, interpreted as a one, begins with a positive-going carrier cycle. Bit 2 1020, interpreted as a zero, begins with a negative-going carrier cycle. Bit 3 1030, begins with a positive-going carrier cycle, so it is interpreted as a one. Note that the sense of the bit interpretations is arbitrary. That is, ones and zeroes could be reversed as long as the interpretation is consistent. Phase transitions only occur when a bitstream changes from a zero to a one or from a one to a zero. A one followed by another one, or a zero followed by another zero, will not cause a phase transition. This type of coding is known as NRZ or nonreturn to zero.

FIG. 22 shows abrupt phase transitions of 180 degrees at the bit boundaries 1015 and 1025. Abrupt phase transitions introduce troublesome high-frequency components into the signal's spectrum. Phase-locked detectors can have trouble tracking such a signal. To solve this problem, the powerline encoding process uses a gradual phase change to reduce the unwanted frequency components.

Figure 23:
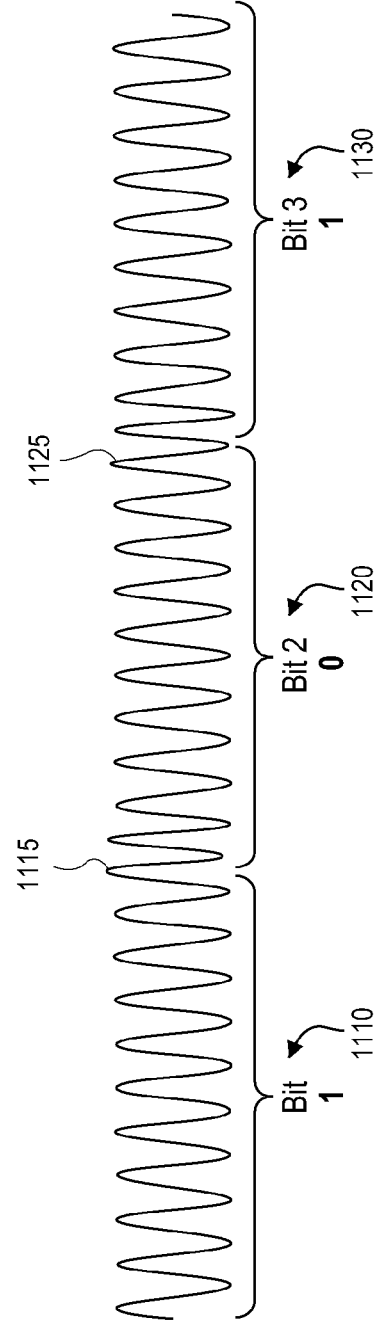
FIG. 23 illustrates a powerline signal with transition smoothing, according to certain embodiments.

FIG. 23 illustrates the powerline BPSK signal of FIG. 22 with gradual phase shifting of the transitions. The transmitter introduces the phase change by inserting approximately 1.5 cycles of carrier at 1.5 times the approximately 131.65 kHz frequency. Thus, in the time taken by one cycle of 131.65 kHz, three half-cycles of carrier will have occurred, so the phase of the carrier is reversed at the end of the period due to the odd number of half-cycles. Note the smooth transitions 1115 and 1125.

In an embodiment, the powerline packets comprise 24 bits. Since a bit takes ten cycles of 131.65 kHz carrier, there are 240 cycles of carrier in a packet, meaning that a packet lasts approximately 1.823 milliseconds. The powerline environment is notorious for uncontrolled noise, especially high-amplitude spikes caused by motors, dimmers, and compact fluorescent lighting. This noise is minimal during the time that the current on the powerline reverses direction, a time known as the powerline zero crossing. Therefore, the packets are transmitted near the zero crossing.

Figure 24:
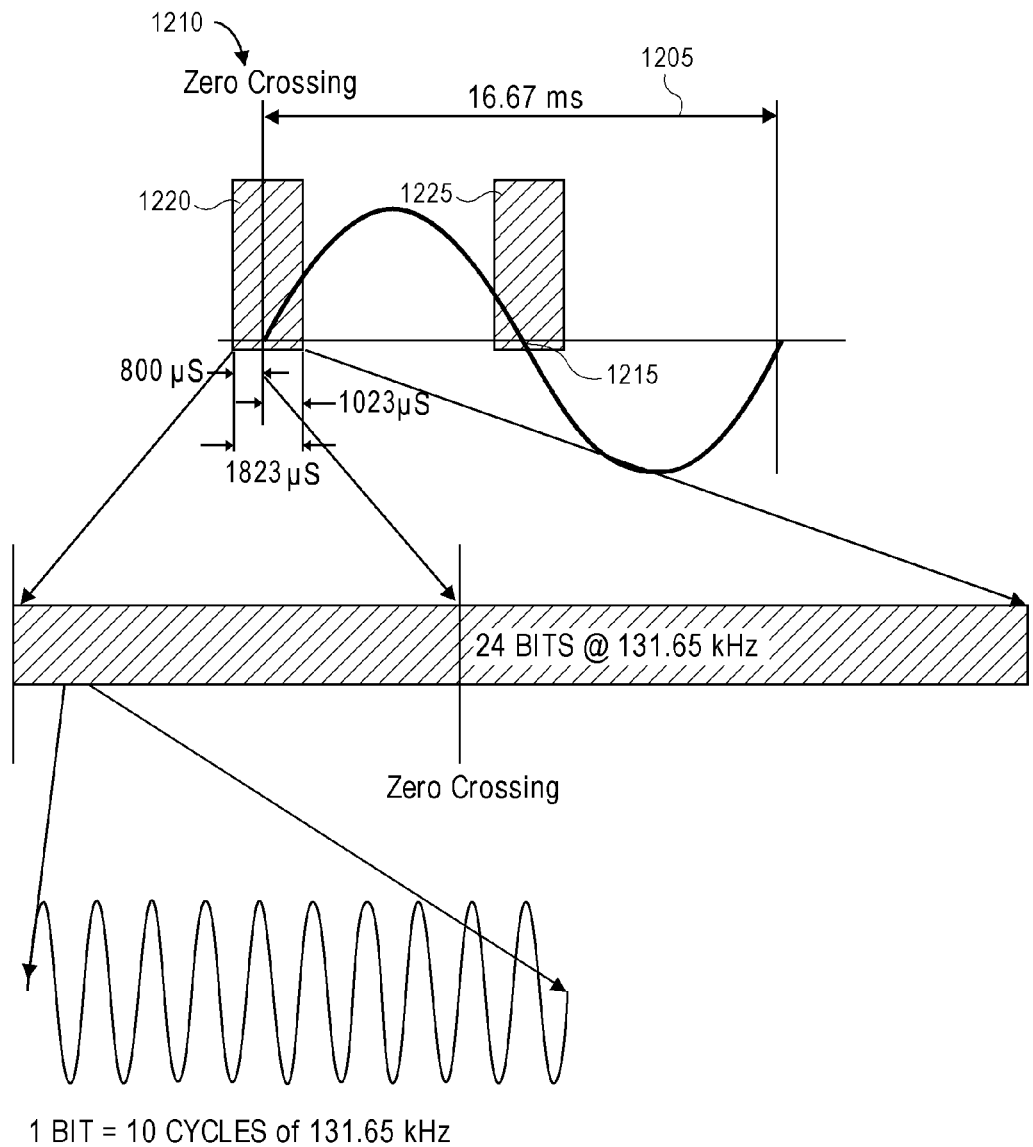
FIG. 24 illustrates powerline signaling applied to the powerline, according to certain embodiments.

FIG. 24 illustrates powerline signaling applied to the powerline. Powerline cycle 1205 possesses two zero crossings 1210 and 1215. A packet 1220 is at zero crossing 1210 and a second packet 1225 is at zero crossing 1215. In an embodiment, the packets 1220, 1225 begin approximately 800 microseconds before a zero crossing and last until approximately 1023 microseconds after the zero crossing.

In some embodiments, the powerline transmission process waits for one or two additional zero crossings after sending a message to allow time for potential RF retransmission of the message by network devices 220.

Figure 25:
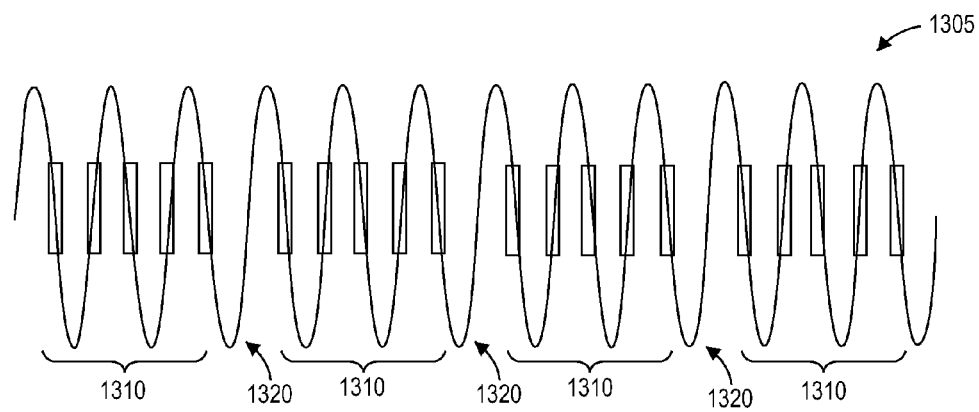
FIG. 25 illustrates standard message packets applied to the powerline, according to certain embodiments.
Figure 26:
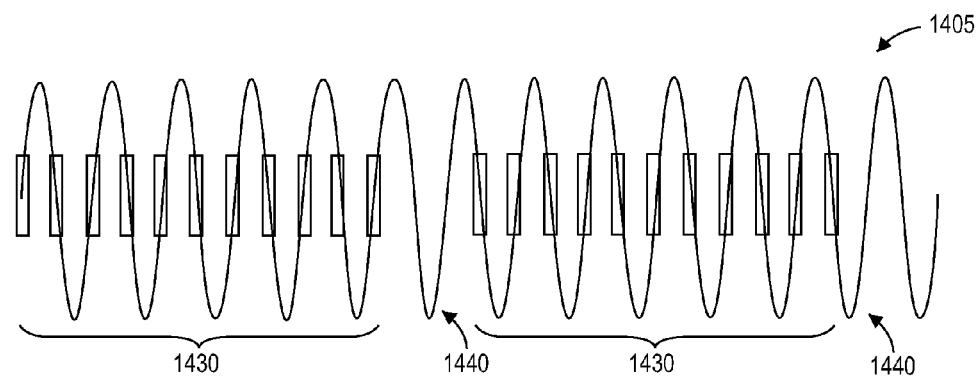
FIG. 26 illustrates extended message packets applied to the powerline, according to certain embodiments.

FIG. 25 illustrates an exemplary series of five-packet standard messages 1310 being sent on powerline signal 1305. In an embodiment, the powerline transmission process waits for at least one zero crossing 1320 after each standard message 1310 before sending another packet. FIG. 26 illustrates an exemplary series of eleven-packet extended messages 1430 being sent on the powerline signal 1405. In another embodiment, the powerline transmission process waits for at least two zero crossings 1440 after each extended message before sending another packet. In other embodiments, the powerline transmission process does not wait for extra zero crossings before sending another packet.

In some embodiments, standard messages contain 120 raw data bits and use six zero crossings, and take approximately 50 milliseconds to send. In some embodiments, extended messages contain 264 raw data bits and use thirteen zero crossings, and take approximately 108.33 milliseconds to send. Therefore, the actual raw bitrate is approximately 2,400 bits per second for standard messages 1310, and approximately 2,437 bits per second for extended messages 1430, instead of the 2880 bits per second the bitrate would be without waiting for the extra zero crossings 1320, 1440.

In some embodiments, standard messages contain 9 bytes (72 bits) of usable data, not counting packet sync and start code bytes, and not counting the message CRC byte. In some embodiments, extended messages contain 23 bytes (184 bits) of usable data using the same criteria. Therefore, the bitrates for usable data are further reduced to 1440 bits per second for standard messages 1310 and 1698 bits per second for extended messages 1430. Counting only the 14 bytes (112 bits) of User Data in extended messages, the User Data bitrate is 1034 bits per second.

The network devices 220 can send and receive the same messages that appear on the powerline using radio frequency signaling. Unlike powerline messages, however, messages sent by radio frequency are not broken up into smaller packets sent at powerline zero crossings, but instead are sent whole. As with powerline, in an embodiment, there are two radio frequency message lengths: standard 10-byte messages and extended 24-byte messages.

Figure 27:
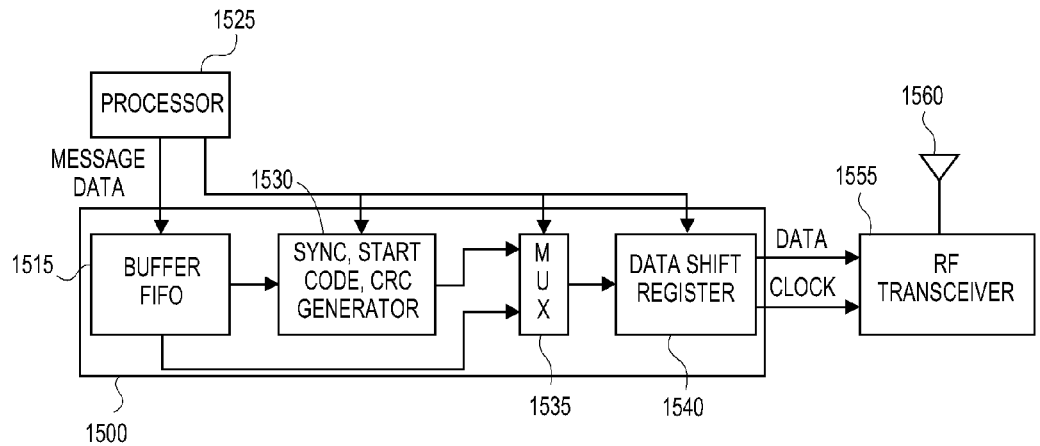
FIG. 27 is a block diagram illustrating the overall flow of information related to transmitting messages via RF, according to certain embodiments.

FIG. 27 is a block diagram illustrating message transmission using radio frequency (RF) signaling comprising processor 1525, RF transceiver 1555, antenna 1560, and RF transmit circuitry 1500. The RF transmit circuitry 1500 comprises a buffer FIFO 1525, a generator 1530, a multiplexer 1535, and a data shift register 1540.

The steps are similar to those for sending powerline messages in FIG. 20, except that radio frequency messages are sent all at once in a single packet. In FIG. 27, the processor 1525 composes a message to send, excluding the CRC byte, and stores the message data into the transmit buffer 1515. The processor 1525 uses the multiplexer 1535 to add sync bits and a start code from the generator 1530 at the beginning of the radio frequency message followed by data shifted out of the first-in first-out (FIFO) transmit buffer 1515.

As the message data is shifted out of FIFO 1515, the CRC generator 1530 calculates the CRC byte, which is appended to the bitstream by the multiplexer 1535 as the last byte of the message. The bitstream is buffered in the shift register 1540 and clocked out to the RF transceiver 1555. The RF transceiver 1555 generates an RF carrier, translates the bits in the message into Manchester-encoded symbols, frequency modulates the carrier with the symbol stream, and transmits the resulting RF signal using antenna 1560. In an embodiment, the RF transceiver 1555 is a single-chip hardware device and the other steps in FIG. 27 are implemented in firmware running on the processor 1525.

Figure 28:
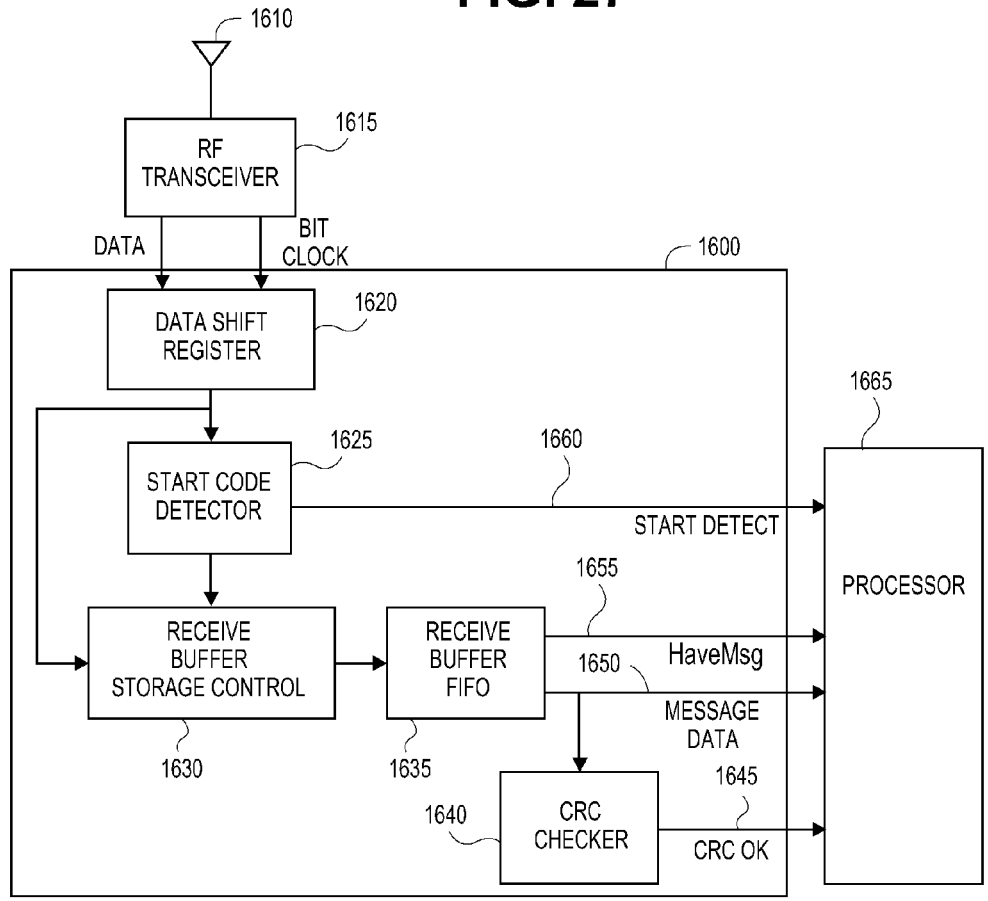
FIG. 28 is a block diagram illustrating the overall flow of information related to receiving messages via RF, according to certain embodiments.

FIG. 28 is a block diagram illustrating message reception using the radio frequency signaling comprising processor 1665, RF transceiver 1615, antenna 1610, and RF receive circuitry 1600. The RF receive circuitry 1600 comprises a shift register 1620, a code detector 1625, a receive buffer storage controller 1630, a buffer FIFO 1635, and a CRC checker 1640.

The steps are similar to those for receiving powerline messages given in FIG. 21, except that radio frequency messages are sent all at once in a single packet. In FIG. 28, the RF transceiver 1615 receives an RF transmission from antenna 1610 and frequency demodulates it to recover the baseband Manchester symbols. The sync bits at the beginning of the message allow the transceiver 1615 to recover a bit clock, which it uses to recover the data bits from the Manchester symbols. The transceiver 1615 outputs the bit clock and the recovered data bits to shift register 1620, which accumulates the bitstream in the message.

The start code detector 1625 looks for the start code following the sync bits at the beginning of the message and outputs a detect signal 1660 to the processor 1665 after it has found one. The start detect flag 1660 enables the receive buffer controller 1630 to begin accumulating message data from shift register 1620 into the FIFO receive buffer 1635. The storage controller 1630 insures that the FIFO receive buffer 1635 stores the data bytes in a message, and not the sync bits or start code. In an embodiment, the storage controller 1630 stores 10 bytes for a standard message and 24 for an extended message, by inspecting the Extended Message bit in the Message Flags byte.

When the correct number of bytes has been accumulated, a HaveMsg flag 1655 is set to indicate a message has been received. The CRC checker 1640 computes a CRC on the received data and compares it to the CRC in the received message. If they match, the CRC OK flag 1645 is set. When the HaveMsg flag 1655 and the CRC OK flag 1645 are both set, the message data 1650 is ready to be sent to processor 1665. In an embodiment, the RF transceiver 1615 is a single-chip hardware device and the other steps in FIG. 28 are implemented in firmware running on the processor 1665.

FIG. 29 is a table 1700 of exemplary specifications for RF signaling within the communication network 200. In an embodiment, the center frequency lies in the band of approximately 902 to 924 MHz, which is permitted for non-licensed operation in the United States. In certain embodiments, the center frequency is approximately 915 MHz. Each bit is Manchester encoded, meaning that two symbols are sent for each bit. A one-symbol followed by a zero-symbol designates a one-bit, and a zero-symbol followed by a one-symbol designates a zero-bit.

Symbols are modulated onto the carrier using frequency-shift keying (FSK), where a zero-symbol modulates the carrier by half of the FSK deviation frequency downward and a one-symbol modulates the carrier by half of the FSK deviation frequency upward. The FSK deviation frequency is approximately 64 kHz. In other embodiments, the FSK deviation frequency is between approximately 100 kHz and 200 kHz. In other embodiments, the FSK deviation frequency is less than 64 kHz. In further embodiment, the FSK deviation frequency is greater than 200 kHz. Symbols are modulated onto the carrier at approximately 38,400 symbols per second, resulting in a raw data rata of half that, or 19,200 bits per second. The typical range for free-space reception is 150 feet, which is reduced in the presence of walls and other RF energy absorbers.

In other embodiments, other encoding schemes, such as return to zero (RZ), Nonreturn to Zero-Level (NRZ-L), Nonreturn to Zero Inverted (NRZI), Bipolar Alternate Mark Inversion (AMI), Pseudoternary, differential Manchester, Amplitude Shift Keying (ASK), Phase Shift Keying (PSK, BPSK, QPSK), and the like, could be used.

Network devices 220 transmit data with the most-significant bit sent first. In an embodiment, RF messages begin with two sync bytes comprising AAAA in hexadecimal, followed by a start code byte of C3 in hexadecimal. Ten data bytes follow in standard messages, or twenty-four data bytes in extended messages. The last data byte in a message is a CRC over the data bytes as disclosed above.

Other Embodiments

In an embodiment, secure installation of a new device onto a home-control network uses pairing with an intelligent device. An intelligent device, such as a smartphone, receives a notification, such as optical pulses, audible tones, short-range radio frequency signals, a watermark, or a barcode, from an uninstalled network device over a second network other than the home-control network. The intelligent device reads and decodes a device key from the notification and sends the device key to a network controller via a third network. The network controller sends a message using the device key to the new device over the home-control network, where the message is formatted to deliver the network key to the network device to permit the network device to send and receive messages comprising the network key over the home-control network.

Systems and methods to enroll a network device into a network that includes a private encryption key are disclosed. In an embodiment, the network device to be installed periodically announces its presence. The announcements do not occur over the network for security, but comprise one or more of optical signals; barcodes, quick response (QR) codes, watermarks, audible signal, and the like. The announcements may begin upon power up or when the device is placed into a network enrollment mode. An intelligent device, such as a smartphone or the like, detects the announcements and discovers the network device. The intelligent device presents a request to the user to confirm enrollment of the network device into the network. After receiving confirmation, the intelligent device issues the private network key for the network associated with the intelligent device to the device to be enrolled into the network.

In another embodiment, the network device to be installed into the network sends the private device key initiated in the device at the factory to the intelligent device. The intelligent device then provides network controller with the device's private key. The network controller then sends a message using the device's private key to the device, where the message comprises the private network key, allowing the device to communicate over the network using the private network key.

In a further embodiment, user interaction with the intelligent device causes the intelligent device to announce and the network device discovers the announcements. The network device can be listening for the announcements upon power up or when placed in a network enrollment mode.

Figure 30A:
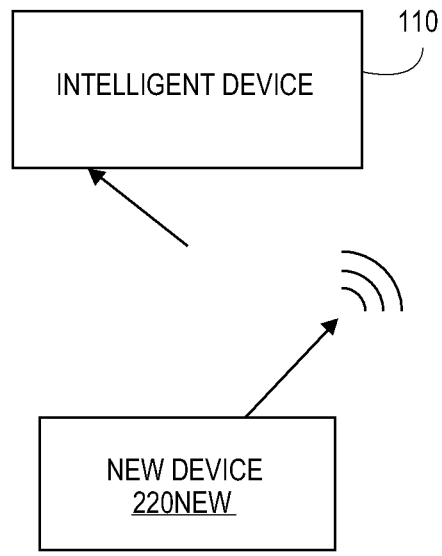
FIG. 30A is a block diagram illustrating a handshake during installation of a new network device on to a network with physical interaction outside of the network, according to certain embodiments.
Figure 30B:
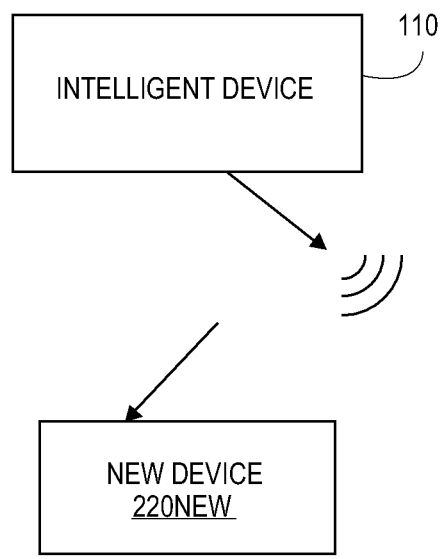
FIG. 30B is a block diagram illustrating a handshake during installation of a new network device on to a network with physical interaction outside of the network, according to certain other embodiments.

FIGS. 30A and 30B are block diagrams illustrating embodiments of secure installation of a new device 220NEW onto a communication network using pairing with an intelligent device, such as a smartphone. In FIG. 30A, the intelligent device 110 receives an indication, such as optical pulses, audible tones, short-range radio frequency signals, a watermark, or a barcode, from the new device 220NEW to initiate discovery of the new device to be installed on the network. In FIG. 30B, the intelligent device sends the indication, such as the optical pulses, the audible tones, the short-range radio frequency signals, the watermark, or the barcode, to initiate discovery of the new device to be installed on the network. The discovery of the new device is performed outside of the network to provide enhanced network security.

Secure installation of a new device onto a home-control network uses pairing with an intelligent device. The new device receives a private key for secure communications on the home-control network from the intelligent device. For security, the private key is transmitted over a second network using a communication medium, such as such as optical pulses, audible tones, or short-range radio frequency signals. The new device decodes the transmission and is capable to securely communicate with other network devices and a network controller over the home-control network using the private key.

Systems and methods to enroll a network device into a network that includes a private encryption key are disclosed. In an embodiment, a private network key is shared through secure communications from a central server through an intelligent device, such as a smartphone, to a new network device. The private network key is shared with the new network device to be installed into the network using secure, non-network communications, allowing the new network device to securely access the network using the private key.

Figure 31:
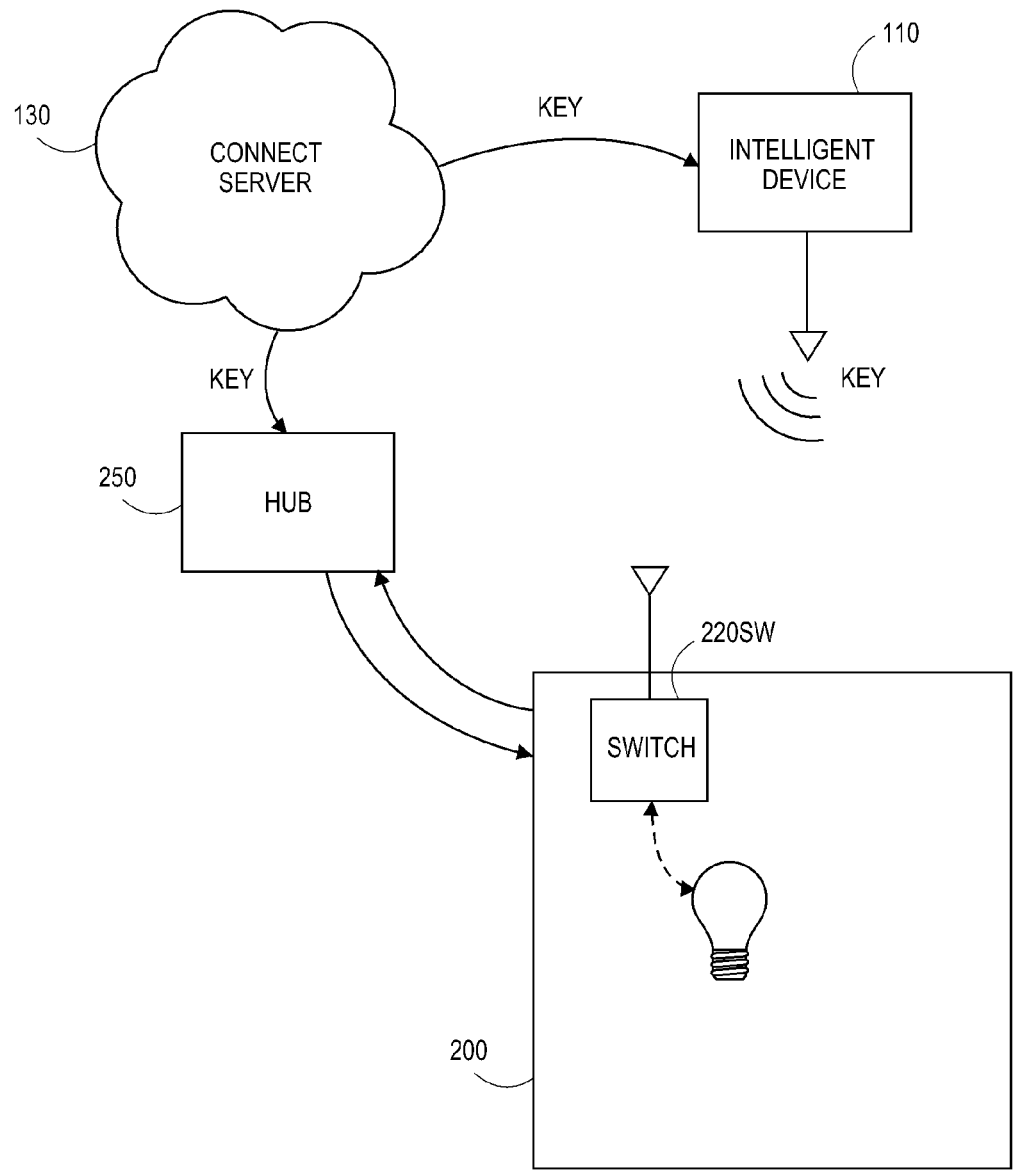
FIG. 31 is a block diagram illustrating a system to securely install a new network device on a network via a remote intelligent device, according to certain embodiments.

FIG. 31 illustrates an exemplary system for secure installation of a new network device 220NEW onto a home-control network 200 using pairing with an intelligent device 110. In the illustrated embodiment, the new network device 220SW is a switch configured to control an LED light. A connect server 130 sends a private key, used for secure network communication between network devices and a network controller 250, to the intelligent device 110. The new device 220SW receives an encoded message comprising at least the private network key from the intelligent device 110. The encoded message comprises one of optical pulses, audible tones, short-range radio frequency signals, and the like send via a second network different from the home-control network 200. The new device 220SW senses and decodes the private network key from the received message. To maintain the security of the home-control network 200, the private network key is not sent to the new device 220NEW over the network 200.

In an embodiment, secure installation of a new device onto a home-control network uses pairing with an existing network device. The new device receives a private key for secure communications on the home-control network from an existing network device. For security, the private key is transmitted over a second network different from the home-control network, using a communication medium such as such as optical pulses, audible tones, or short-range radio frequency signals. The new device decodes the transmission and is capable to securely communicate with other network devices and a network controller over the home-control network using the private key.

Systems and methods to enroll a new network device into a home-control network that includes a private encryption key are disclosed. In an embodiment, another network device shares the private network key with the new device to be installed into the network. The existing network device announces the private encryption key. The announcements do not occur over the network for security, but comprise one or more of optical signals, barcodes, quick response (QR) codes, watermarks, audible signal, and the like. The new network device discovers the announcements and decodes the private network key, allowing the new network device to securely access the network.

Figure 32:
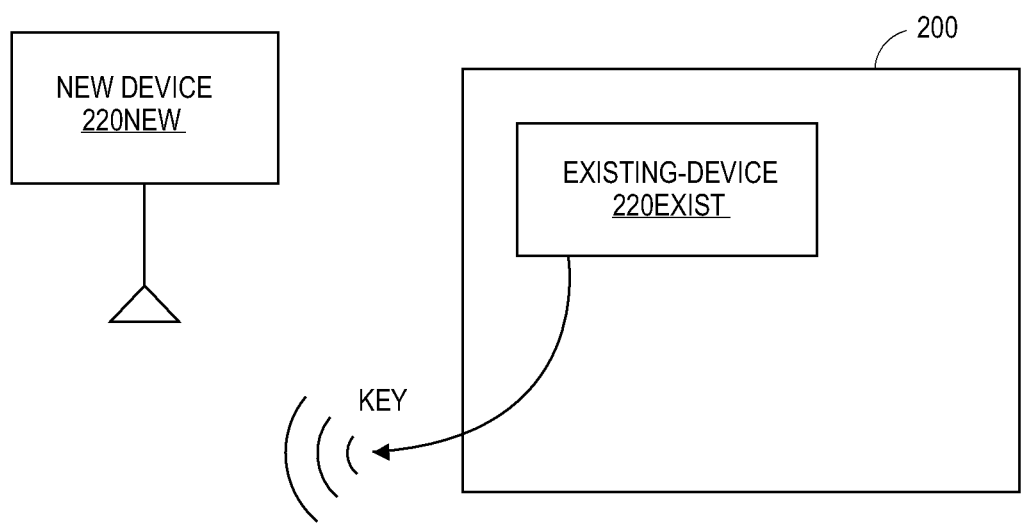
FIG. 32 is a block diagram illustrating a system for secure installation of a new network device on a network using an installed network device, according to certain embodiments.

FIG. 32 illustrates an exemplary system for secure installation of a new network device 220NEW onto a communication network 200 using pairing with a network device 220EXIST previously installed onto the network 200. The new device 220NEW receives an encoded message comprising at least a private network key, used for secure network communication between network devices and a network controller, from the existing network device 220EXIST, but not over the network 200. The encoded message comprises one of optical pulses, audible tones, short-range radio frequency signals, and the like. To maintain the security of the network 200, the private network key is not sent to the new device 220NEW over the network 200. The new device 220NEW senses and decodes the private network key from the received message and can use the network key to securely send and receive messages over the network 220.

For security, an encryption key for encoding and decoding messages on a network is sent to a network controller without being sent through the network. Initial controller installation uses multiple channels to a cloud server to provide secure communications. Communications over a first channel provides an authorization token and communications over a second channel provides network device information.

Systems and methods to enroll a network controller into a new network that does not include network devices yet are disclosed. The network uses a private encryption key for secure communications over the network. In an embodiment, the network controller established a local IP address using a local area network (LAN). Once the IP address is established, the network controller communicates with cloud servers using the LAN/router. The network controller reports its unique identifier and connections information to a database. An intelligent device, such as a smartphone, requests the cloud servers to create a new user account for the network. The intelligent device communicates to the cloud servers on the same public IP address as the network controller. As part of the new account creation, the unique identifier of the network controller is associated with the new account.

In an embodiment, a user uses an intelligent device to send commands to and receive responses from the network controller that communicates with devices on the network. In an embodiment, the network comprises a home automation or home-control network. In another embodiment, the network comprises an INSTEON® network. The commands, for example, control the devices, such as lights, thermostats, air conditioners, and the like, connected to the network. The responses, for example, indicate to the user the status, such as ON, OFF, and the like, of the devices on the network. Before the network controller can be linked to existing or new devices on the network in order to send the commands or receive the status of the devices, a secure process to establish communications between the network controller and the intelligent device is implemented. The secure process is independent of the home-control network.

Figure 33A:
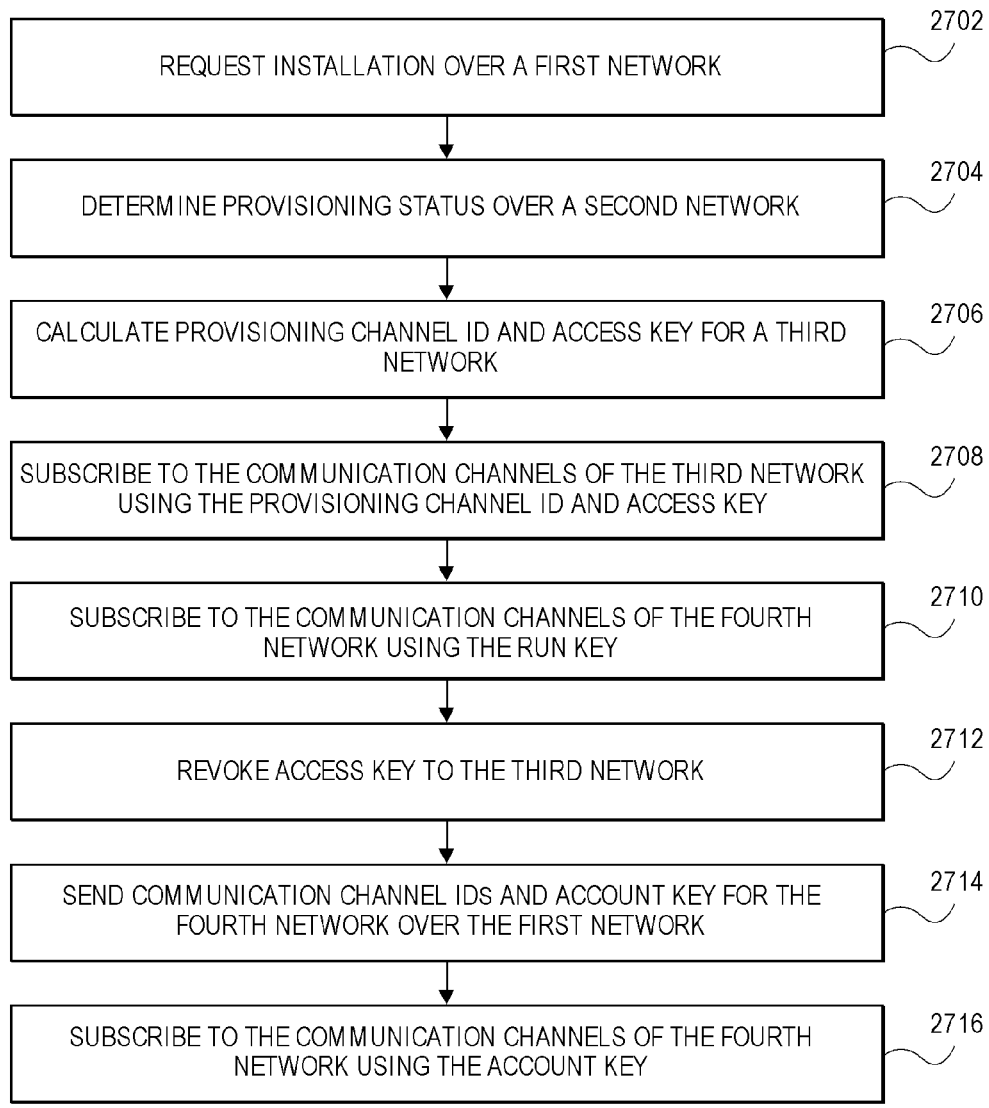
FIG. 33A illustrates a process to securely install a network controller, according to certain embodiments.
Figure 33B:
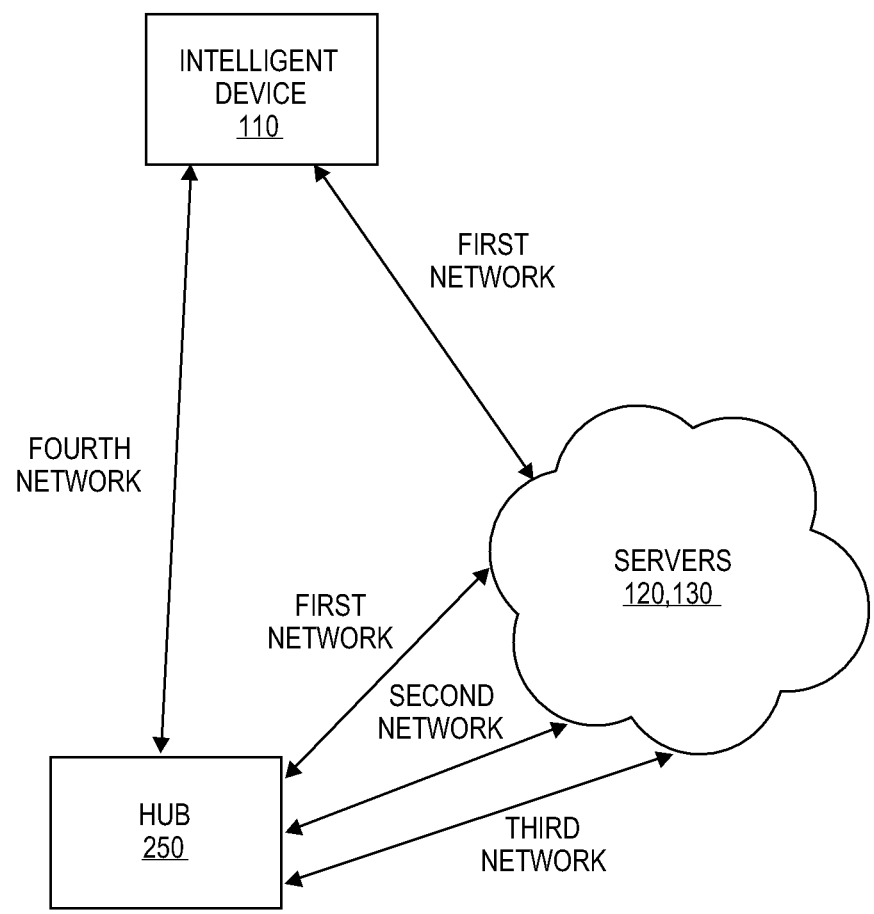
FIG. 33B is a block diagram illustrating a multi-network installation system, according to certain embodiments.

FIG. 33A illustrates a process to securely install a communication path for communications between an intelligent device and a network controller. In an embodiment, the process uses a multi-network system illustrated in FIG. 33B. In an embodiment, a messaging server 120, a control server 130, and the intelligent device 110, such as a smartphone, communicate to provision the network controller 250 with the channel identifiers and an authorization token used to send and receive messages securely between the network controller 250 and the intelligent device 110. Beginning at step 2702, the network controller 250 requests installation from the connect server 130 over a first network, such as the Internet.

At step 2704, the connect server 130 determines the provisioning status of the network controller 250 over a second network associated with the messaging server 120. In an embodiment, the network controller 250 is behind a firewall for security and the connect server 130 cannot request the provisioning status. To overcome this, the network controller 250 broadcasts its provisioning status over the second network.

When the network controller 250 does not have stored in its memory the channel identifiers and authorization token to be used to communicate with the intelligent device 110, the connect server 130 and the network controller 250 each calculate, at step 2706, a provisioning channel identifier and an access key for a third network that is private to the network controller 250 and the connect server 130. At step 2708, the network controller 250 and the connect server 130 each subscribe to the third network using the provisioning channel identifier and the access key, and the connect server 130 provisions the network controller 250 with the channel identifiers and authorization token for network controller/intelligent device communications over a fourth network.

At step 2710, the network controller 250 subscribes to the channels of the fourth network using the authorization token, and at step 2712, the connect server 130 revokes the access key to the third network.

At step 2714, the connect server 130 sends over the first network to the intelligent device 110, the channel identifiers for the network controller/intelligent device communications over the fourth network and an account key. At step 2716, the intelligent device 110 subscribes to the channels of the fourth network using the account key. Thus, the network controller 250 and the intelligent device 100 are now able to communicate securely over the fourth network.

In an embodiment, a new network controller installed onto an existing home-control network links to a network device on the home-control network. The linked network device returns its linked list to the new network controller, which contacts each network device on the linked list. Responding network devices are linked to the new network controller and return their linked lists. The new network controller contacts the network devices on these linked lists that have not been previously contacted to request additional linked lists. The procedure continues until the new controller determines that there are no un-contacted devices.

If network controller that is installed on an existing network fails, it may need to be replaced with a new network controller that has no knowledge of the existing network configuration. Systems and methods to enroll a new network controller into an existing network that includes a private encryption key are disclosed. The existing network comprises one or more network devices. Spidering techniques are used to rebuild the link table in the new network controller and the cloud server database.

In an embodiment, a user connects a new network controller to a local area network, such as a home-control network. The network controller contacts one or more cloud servers, which store existing account comprising information associated with the network, but the existing account is not associated with the new controller. The account information indicates that an existing network controller is no longer reporting, such as by a lack of a message within an appropriate time-out, for example. In one embodiment, the indication that an existing network controller is no longer reporting alerts the account holder to the presence of the new network controller and initiates installation of the new network controller into the network. In another embodiment, the user uses an intelligent device, such as a smartphone and the like, to initiate the new network controller installation.

The existing account information comprises a list of unique device identifiers associated with the network devices on the network. In an embodiment, each unique device identifier comprises a random number that is unique to a network device and stored in the network device. Each network device recognizes messages send over the network that comprise its unique device identifier and not messages comprising another devices unique identifier. Further, the network devices recognize messages sent over the network that comprise a network key associated with the network and stored in the network controller associated with the network. However, the existing network devices recognize messages comprising the network key associated with the prior network controller, not the network key associated with the new network controller.

During the new network controller installation, the new network controller deletes the network key associated with the prior network controller and installs its network key in the network devices. In order to find the network devices on the network, the one or more cloud servers download the list of unique device identifiers to the new network controller.

The new network controller uses the unique identifier list to initiate a link database dump from each network device on the downloaded list. Any device unique identifiers found in the database dumps from each of the known network devices are used to initiate an additional database dump from the unknown device. If additional unknown unique identifiers are discovered, additional link database dumps are used until all devices on the network are found.

For each new device found, the network controller initiates a request of additional device information, including device category, sub-category, firmware and hardware revision numbers Database record links downloaded that contain the network key of the previous non-existent network controller are used to initiate a new database record link with the network key associated with the new network controller, and to delete the network key of the previous non-existent network controller. This prevents excessive network traffic directed to network controllers that no longer exist.

Figure 34:
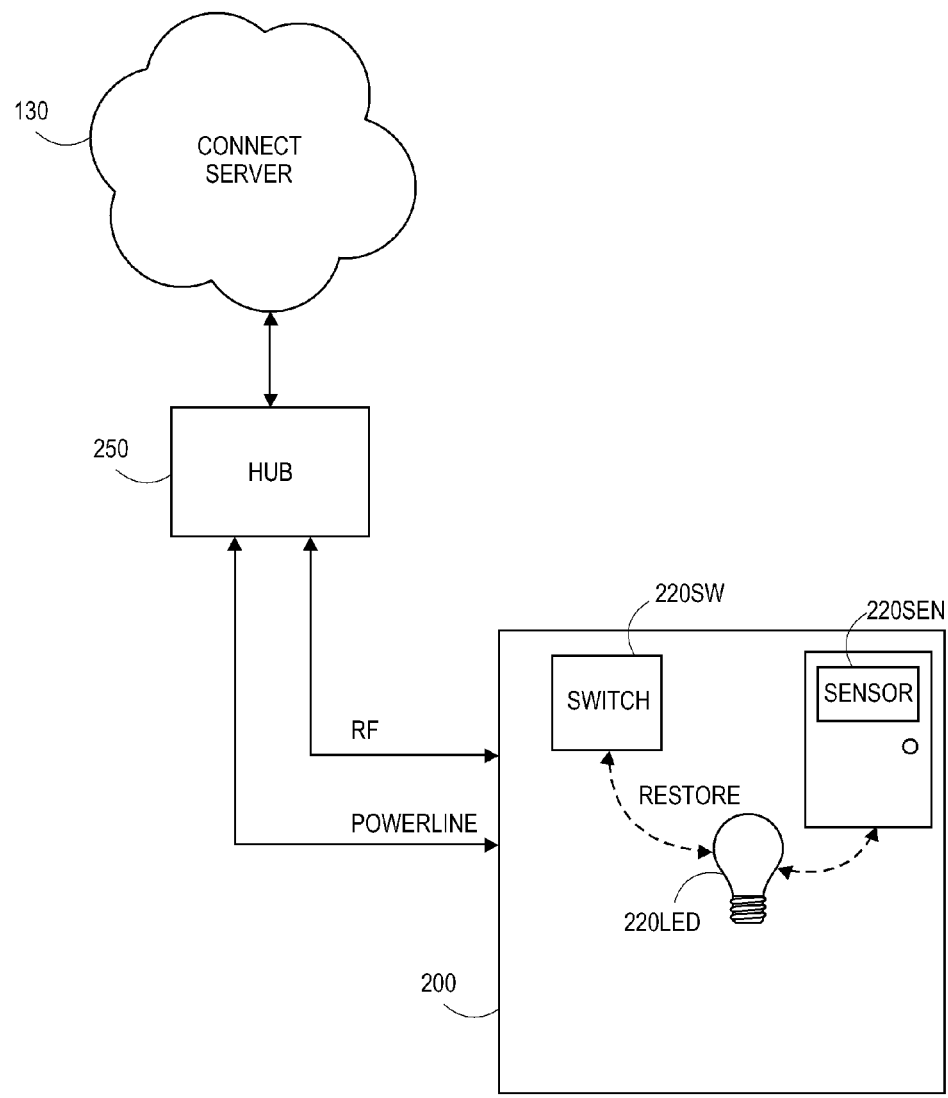
FIG. 34 is a block diagram illustrating a system to install a new network controller on an existing network, according to certain embodiments.

FIG. 34 is a block diagram illustrating a system to install a new network controller 250 on an existing network 200. The system comprises a connect server 130, the new network controller 250, and the existing network 200 comprising one or more network devices 220. In the example illustrated in FIG. 34, the network 200 comprises a switch 220SW, a door sensor 220SEN, and an LED light 220LED, where the switch 220SW and the sensor 220SEN are linked to the LED light 220LED and configured to turn the LED light 220LED ON/OFF.

In an embodiment, the new network controller 250 discovers network devices 220 on the network 200 by requesting a list of the unique device identifiers of the network devices 220 on the network 200 from the connect server 130. The new network controller 250 contacts a first device 220 using its unique identifier and requests the list of network devices 220 linked to the first device 220. The new network controller 250 continues to discover additional network devices 220 by retrieving the linked lists from the discovered network devices 220 until no undiscovered devices 220 are found.

TERMINOLOGY

Unless the context clearly requires otherwise, throughout the description and the claims, the words "comprise," "comprising," and the like are to be construed in an inclusive sense, as opposed to an exclusive or exhaustive sense; that is to say, in the sense of "including, but not limited to." The words "coupled" or connected", as generally used herein, refer to two or more elements that may be either directly connected, or connected by way of one or more intermediate elements. Additionally, the words "herein," "above," "below," and words of similar import, when used in this application, shall refer to this application as a whole and not to any particular portions of this application. Where the context permits, words in the above Detailed Description using the singular or plural number may also include the plural or singular number respectively. The word "or" in reference to a list of two or more items, that word covers all of the following interpretations of the word: any of the items in the list, all of the items in the list, and any combination of the items in the list.

Moreover, conditional language used herein, such as, among others, "can," "could," "might," "may," "e.g.," "for example," "such as" and the like, unless specifically stated otherwise, or otherwise understood within the context as used, is generally intended to convey that certain embodiments include, while other embodiments do not include, certain features, elements and/or states. Thus, such conditional language is not generally intended to imply that features, elements and/or states are in any way required for one or more embodiments or that one or more embodiments necessarily include logic for deciding, with or without author input or prompting, whether these features, elements and/or states are included or are to be performed in any particular embodiment.

The above detailed description of certain embodiments is not intended to be exhaustive or to limit the invention to the precise form disclosed above. While specific embodiments of, and examples for, the invention are described above for illustrative purposes, various equivalent modifications are possible within the scope of the invention, as those ordinary skilled in the relevant art will recognize. For example, while processes, steps, or blocks are presented in a given order, alternative embodiments may perform routines having steps, or employ systems having blocks, in a different order, and some processes, steps, or blocks may be deleted, moved, added, subdivided, combined, and/or modified. Each of these processes, steps, or blocks may be implemented in a variety of different ways. Also, while processes, steps, or blocks are at times shown as being performed in series, these processes, steps, or blocks may instead be performed in parallel, or may be performed at different times.

The teachings of the invention provided herein can be applied to other systems, not necessarily the systems described above. The elements and acts of the various embodiments described above can be combined to provide further embodiments.

While certain embodiments of the inventions have been described, these embodiments have been presented by way of example only, and are not intended to limit the scope of the disclosure. Indeed, the novel methods and systems described herein may be embodied in a variety of other forms; furthermore, various omissions, substitutions, and changes in the form of the methods and systems described herein may be made without departing from the spirit of the disclosure. The accompanying claims and their equivalents are intended to cover such forms or modifications as would fall within the scope and spirit of the disclosure.

What is claimed is:

1. A system to install a network device onto a home-control network, the system comprising:
    at least one cloud server configured to store a database comprising a plurality of unique device identifiers, wherein each of the unique device identifiers is associated with a device key;
    a hub configured to store in memory a network key and to send and receive transmissions over a home-control network;
    a network device configured to store in memory one of the plurality of unique device identifiers and the device key associated with the one of the plurality of unique identifiers, wherein the device key is different from the network key; and
    an application comprising software instructions and configured to be installed on an intelligent device, wherein the application, when executed, causes the intelligent device to send a first message to the at least one cloud server over communication channels of a second network to place the at least one cloud server in a learning mode and to display a request to a user to perform a physical action on the network device;
    the at least one cloud server further configured to transmit a second message to the hub over the communication channels of the second network to place the hub in the learning mode after the at least one cloud server is placed in the learning mode, wherein the second network is different from the home-control network;
    the network device configured to transmit a third unencrypted message comprising the one of the plurality of unique device identifiers to the hub over the home-control network after the physical action has been performed on the network device by the user to place the network device into a linking mode;
    the hub further configured to transmit a fourth message comprising the one of the plurality of unique device identifiers to the at least one cloud server over the communication channels of the second network after the hub is placed in the learning mode;
    the at least one cloud server further configured to retrieve from the database the device key associated with one of the plurality of unique device identifiers and to transmit a fifth message comprising the retrieved device key to the hub over the communication channels of the second network;
    the hub further configured to encrypt a sixth message using the retrieved device key, wherein the sixth message comprises the network key, the hub further configured to transmit the sixth encrypted message to the network device over the home-control network, the sixth encrypted message formatted to deliver the network key to the network device to permit the network device to encrypt messages using the network key for transmission over the home-control network.

2. The system of claim 1 wherein the one of the plurality of unique device identifiers comprises a random number unique to the network device.

3. The system of claim 1 wherein the network key comprises an encryption code unique to the home-control network.

4. The system of claim 1 wherein the device key associated with the one of the plurality of unique device identifiers comprises an encryption code unique to the network device.

5. The system of claim 1 wherein the home-control network comprises a mesh network configured to propagate the transmissions using powerline signaling and radio frequency (RF) signaling.

6. The system of claim 5 wherein the powerline signaling comprises message data modulated onto a carrier signal and the modulated carrier signal is added to a powerline waveform, and wherein the RF signaling comprises the message data modulated onto an RF waveform.

7. The system of claim 1 wherein the intelligent device comprises a smartphone.

8. The system of claim 1 wherein the physical action comprises at least one of pushing a button, switching a switch, and entering a screen selection.

9. A method to install a network device onto a home-control network, the method comprising:
    storing, in at least one cloud server, a database comprising a plurality of unique device identifiers, wherein each of the unique device identifiers is associated with a device key;
    storing, in a memory of a hub, a network key, wherein the hub is configured to send and receive transmissions over a home-control network;
    storing, in a memory of a network device, one of the plurality of unique device identifiers and the device key associated with the one of the plurality of unique identifiers, wherein the device key is different from the network key;
    sending a first message from an intelligent device to the at least one cloud server over communication channels of a second network to place the at least one cloud server in a learning mode and to display a request to a user to perform a physical action on the network device;
    transmitting a second message from the at least one cloud server to the hub over the communication channels of the second network to place the hub in the learning mode after the at least one cloud server is placed in the learning mode, wherein the second network is different from the home-control network;

transmitting a third unencrypted message comprising the one of the plurality of unique device identifiers from the network device to the hub over the home-control network after a physical action has been performed on the network device by a user to place the network device into a linking mode;

transmitting a fourth message comprising the one of the plurality of unique device identifiers from the hub to the at least one cloud server over the communication channels of the second network after the hub is placed in the learning mode;

retrieving, from the database, the device key associated with the one of the plurality of unique device identifiers;

transmitting a fifth message comprising the retrieved device key from the at least one cloud server to the hub over the communication channels of the second network; and encrypting a sixth message at the hub using the retrieved device key, wherein the sixth message comprises the network key;

transmitting the sixth encrypted message comprising the network key from the hub to the network device over the home-control network, the sixth encrypted message formatted to deliver the network key to the network device to permit the network device to encrypt messages using the network key for transmission over the home-control network.

10. The method of claim 9 where the one of the plurality of unique device identifiers comprises a random number unique to the network device.

11. The method of claim 9 wherein the network key comprises an encryption code unique to the home-control network.

12. The method of claim 9 wherein the device key associated with the one of the plurality of unique device identifiers comprises an encryption code unique to the network device.

13. The method of claim 9 wherein the home-control network comprises a mesh network configured to propagate the transmissions using powerline signaling and radio frequency (RF) signaling.

14. The method of claim 13 wherein the powerline signaling comprises message data modulated onto a carrier signal and the modulated carrier signal is added to a powerline waveform, and wherein the RF signaling comprises the message data modulated onto an RF waveform.

15. The method of claim 9 wherein the intelligent device comprises a smartphone.

16. The method of claim 9 wherein the physical action comprises at least one of pushing a button, switching a switch, and entering a screen selection.

* * * * *